(12) United States Patent
Andersson et al.

(10) Patent No.: US 10,380,789 B2
(45) Date of Patent: Aug. 13, 2019

(54) METHOD AND APPARATUS FOR EFFICIENT DEPTH PREPASS

(71) Applicant: Intel Corporation, Santa Clara, CA (US)

(72) Inventors: Magnus Andersson, Helsingborg (SE); Tomas G. Akenine-Moller, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/268,500

(22) Filed: Sep. 16, 2016

(65) Prior Publication Data

US 2018/0082469 A1    Mar. 22, 2018

(51) Int. Cl.
| | |
|---|---|
| *G06T 15/40* | (2011.01) |
| *G06T 1/20* | (2006.01) |
| *G06T 15/00* | (2011.01) |
| *G06T 17/20* | (2006.01) |
| *G06T 1/60* | (2006.01) |

(52) U.S. Cl.
CPC .............. *G06T 15/405* (2013.01); *G06T 1/20* (2013.01); *G06T 1/60* (2013.01); *G06T 15/005* (2013.01); *G06T 15/40* (2013.01); *G06T 17/20* (2013.01)

(58) Field of Classification Search
USPC ....................................................... 345/422
See application file for complete search history.

(56) References Cited

U.S. PATENT DOCUMENTS

| | | | | |
|---|---|---|---|---|
| 6,646,639 | B1* | 11/2003 | Greene ................. | G06T 15/005 345/422 |
| 6,894,689 | B1* | 5/2005 | Greene ................. | G06T 15/005 345/422 |
| 7,023,437 | B1* | 4/2006 | Voorhies ............... | G06T 15/005 345/419 |
| 7,315,301 | B1* | 1/2008 | Sell ....................... | G06T 15/405 345/422 |
| 7,375,727 | B1* | 5/2008 | Greene ................. | G06T 15/405 345/419 |

(Continued)

OTHER PUBLICATIONS

International Search Report and Written Opinion for Application No. PCT/US2017/046546, dated Nov. 8, 2017, 12 pages.

(Continued)

*Primary Examiner* — Kimbinh T Nguyen
(74) *Attorney, Agent, or Firm* — Nicholson De Vos Webster & Elliott LLP

(57) ABSTRACT

An apparatus and method are described for performing an efficient depth prepass. For example, one embodiment of a method comprising: a method comprising: performing a first pass through a specified portion of a graphics pipeline with only depth rendering active; initializing a coarse depth buffer within the specified portion of the graphics pipeline during the first pass, the coarse depth buffer storing depth data at a level of granularity less than that stored in a per-pixel depth buffer, which is not initialized during the first pass; and performing a second pass through the graphics pipeline following the first pass, the second pass utilizing the full graphics pipeline and using values in the coarse depth buffer initialized by the first pass.

27 Claims, 28 Drawing Sheets

(56) References Cited

U.S. PATENT DOCUMENTS

| | | | |
|---|---|---|---|
| 7,683,901 B2* | 3/2010 | Tsao | G06T 15/40 345/422 |
| 8,269,768 B1* | 9/2012 | Greene | G06T 15/405 345/419 |
| 8,537,168 B1 | 9/2013 | Steiner et al. | |
| 9,019,271 B2* | 4/2015 | Liang | G06T 15/405 345/422 |
| 9,098,943 B1* | 8/2015 | Baldwin | G06T 11/40 |
| 2006/0033735 A1 | 2/2006 | Seiler et al. | |
| 2008/0273033 A1* | 11/2008 | Brennan | G06T 1/60 345/422 |
| 2014/0354634 A1* | 12/2014 | Amsinck | G06T 15/405 345/420 |
| 2015/0187125 A1 | 7/2015 | Hasselgren et al. | |
| 2015/0269771 A1 | 9/2015 | Hasselgren et al. | |
| 2015/0287166 A1* | 10/2015 | Cerny | G02B 27/0172 345/423 |
| 2016/0086299 A1 | 3/2016 | Sharma et al. | |
| 2017/0316544 A1* | 11/2017 | Cerny | G06T 17/20 |

OTHER PUBLICATIONS

International Preliminary Report on Patentability for Application No. PCT/US2017/046546, dated Mar. 19, 2019, 8 pages.

\* cited by examiner

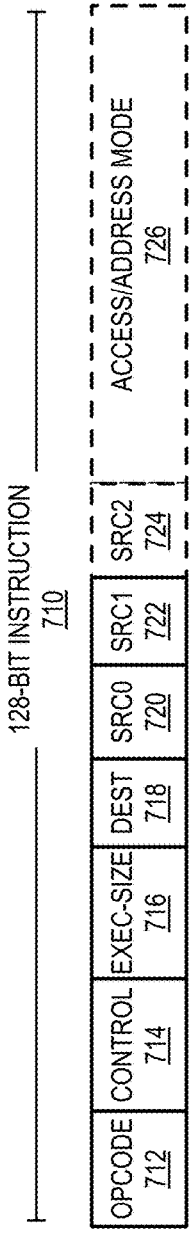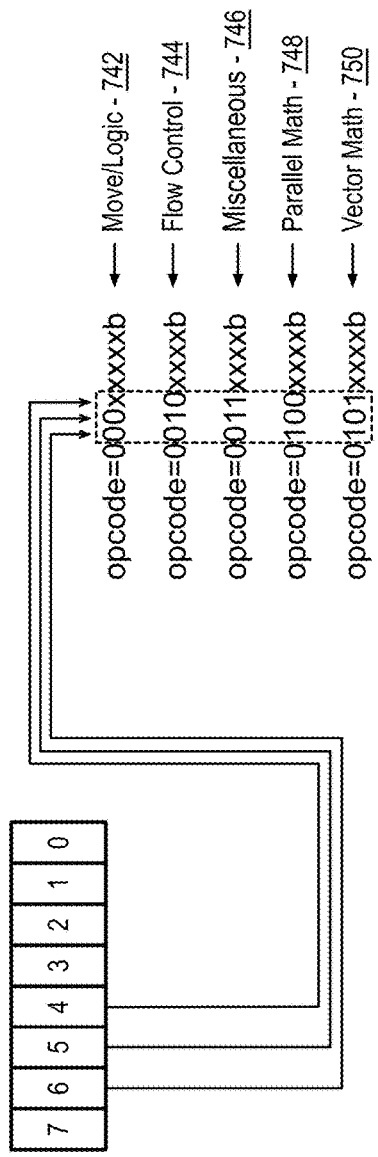
FIG. 7

FIG. 9A    GRAPHICS PROCESSOR COMMAND FORMAT
900
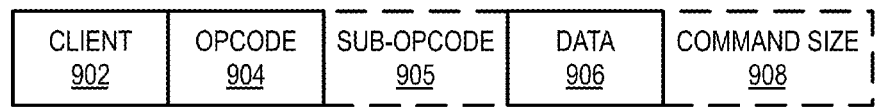
FIG. 9B    GRAPHICS PROCESSOR COMMAND SEQUENCE
910
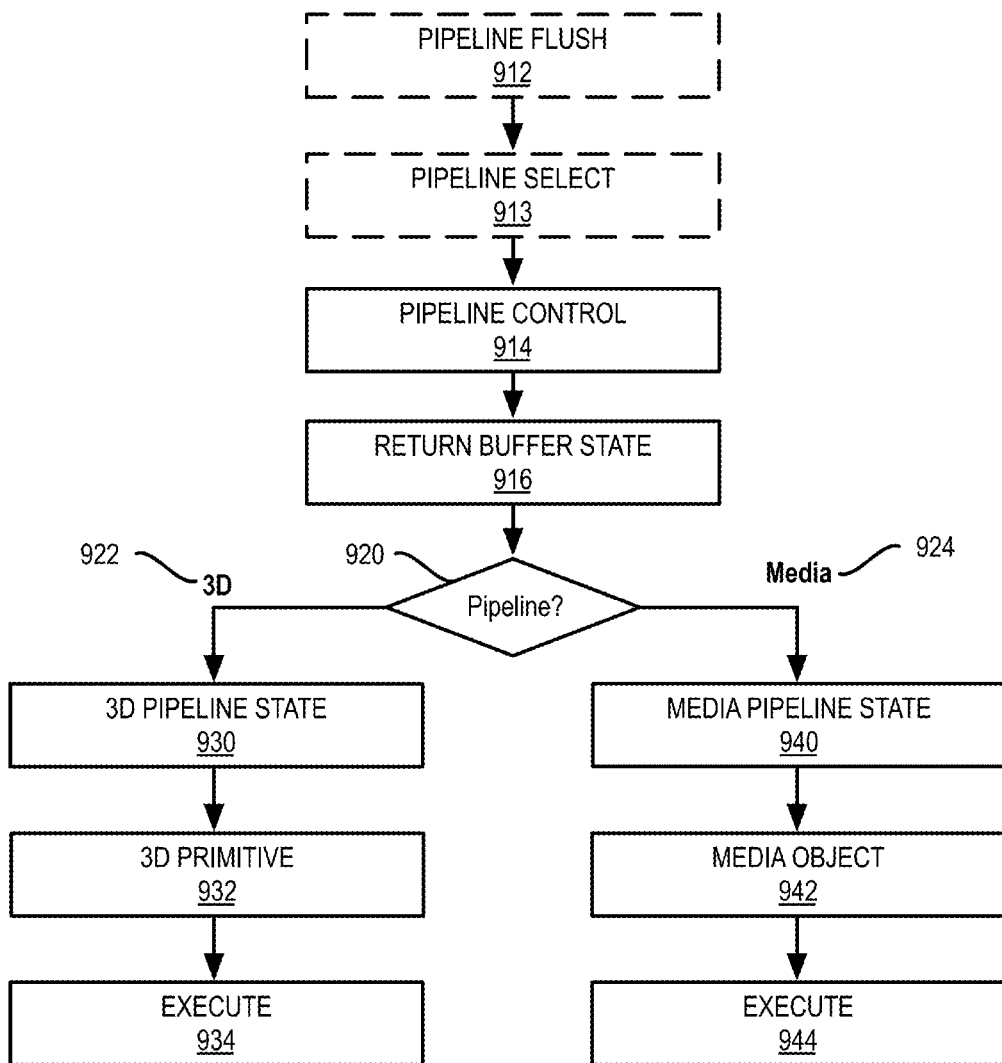

METHOD AND APPARATUS FOR EFFICIENT DEPTH PREPASS

BACKGROUND

Field of the Invention

This invention relates generally to the field of computer processors. More particularly, the invention relates to an apparatus and method for identifying hits in a ray tracing architecture.

Description of the Related Art

For accelerated rendering, it is common to perform a depth prepass, sometimes referred to as "Z-prepass." The reason for this is that the GPU or graphics processor should ideally perform pixel shading only for visible surfaces. When a scene is rendered without a Z-prepass, a triangle that is far away may be rendered first and hence pixel shading will be performed, and later a closer triangle may overwrite that far-away triangle with the pixel shading of the closer triangle. Hence, the work done on the far-away triangle was done in vain since it did not contribute to the image. Instead, it is common to render the scene twice using a Z-prepass as a first pass. In the first pass, the scene is rendered but only depth is written to the depth buffer and no pixel shading is performed nor is anything written to the color buffer. As a result, when the first pass has ended, the depth buffer contains the depth of the closest surface at each pixel. The second pass renders all the triangles with pixel shading on, depth writes turned off and the depth test as EQUAL, i.e., color is only written if the fragment has the same depth as the depth in the depth buffer. This means that all fragments of rendered triangles that are farther away than the depths in the depth buffer will NOT perform any pixel shading, i.e., pixel shading will only be performed on the closest surface in each pixel, resulting in more efficient pixel shading. In addition, all graphics architectures have some form of hierarchical depth buffer with culling, such as the HiZ buffer, and the first pass will "prime" the HiZ-buffer (typically a Zmin and Zmax value per 8×8 pixels) and hence, occlusion culling can be done efficiently in the second pass using the HiZ buffer. In the example above, it is assumed that all geometry/triangles are opaque.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
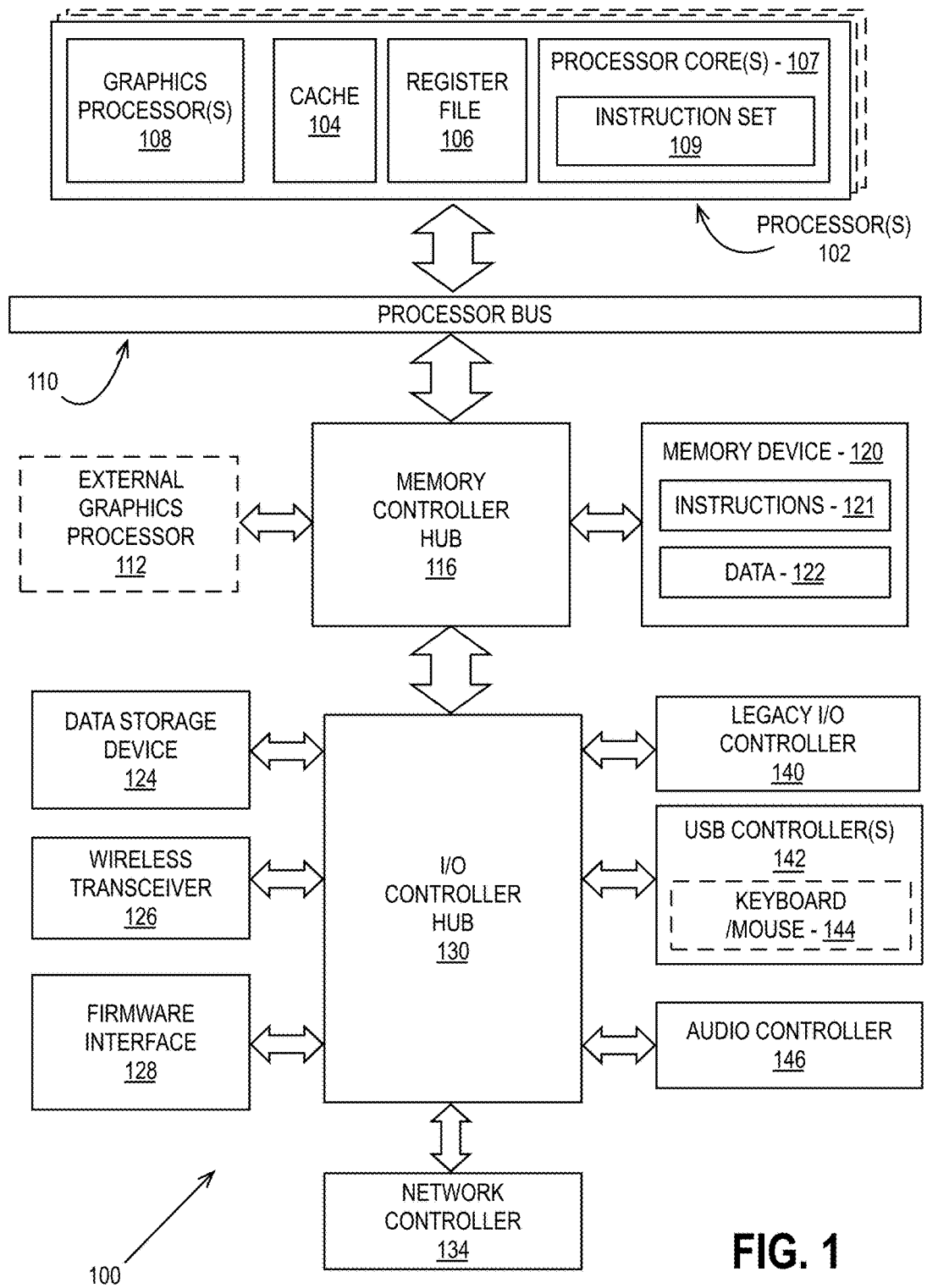
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
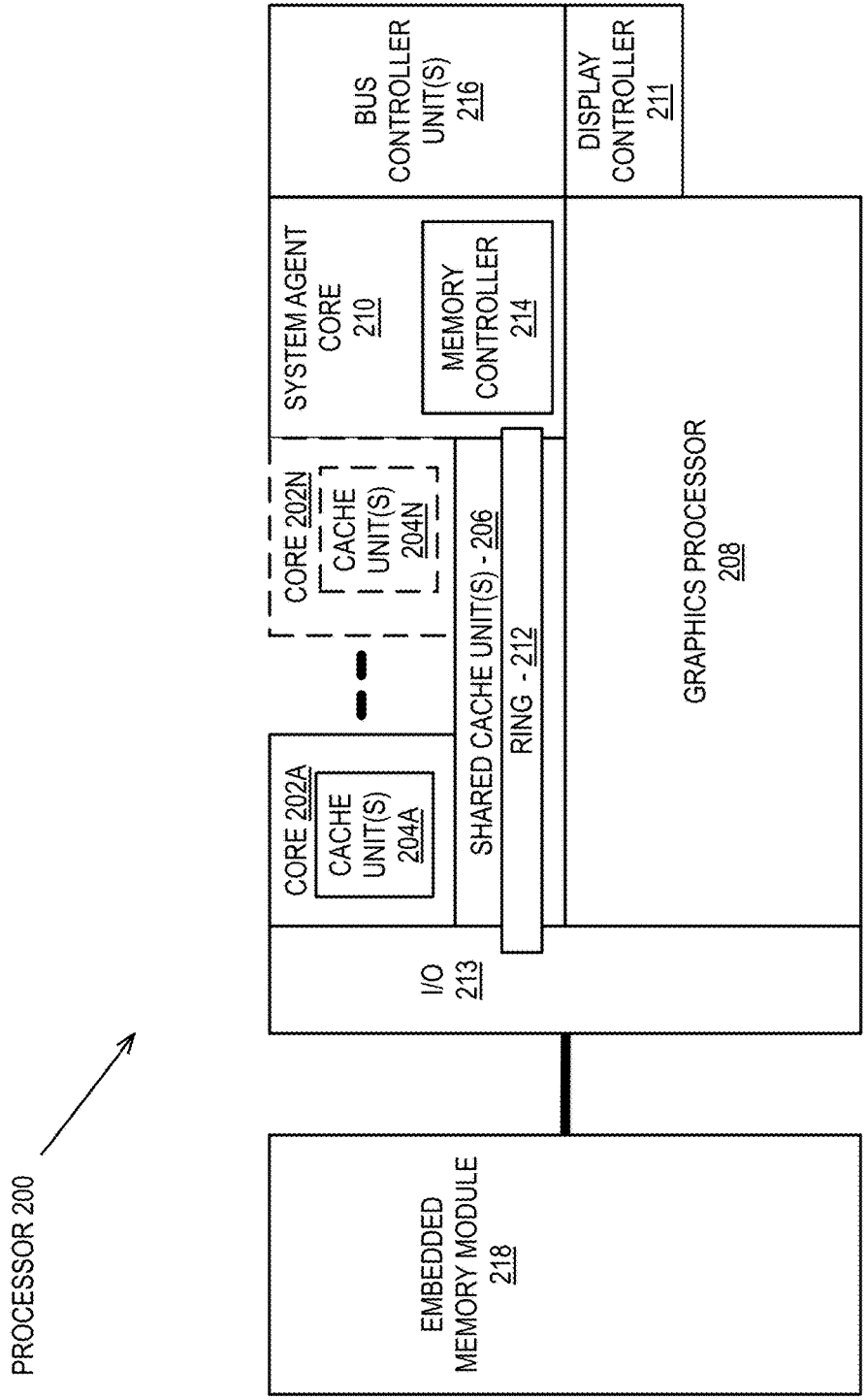
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-

202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
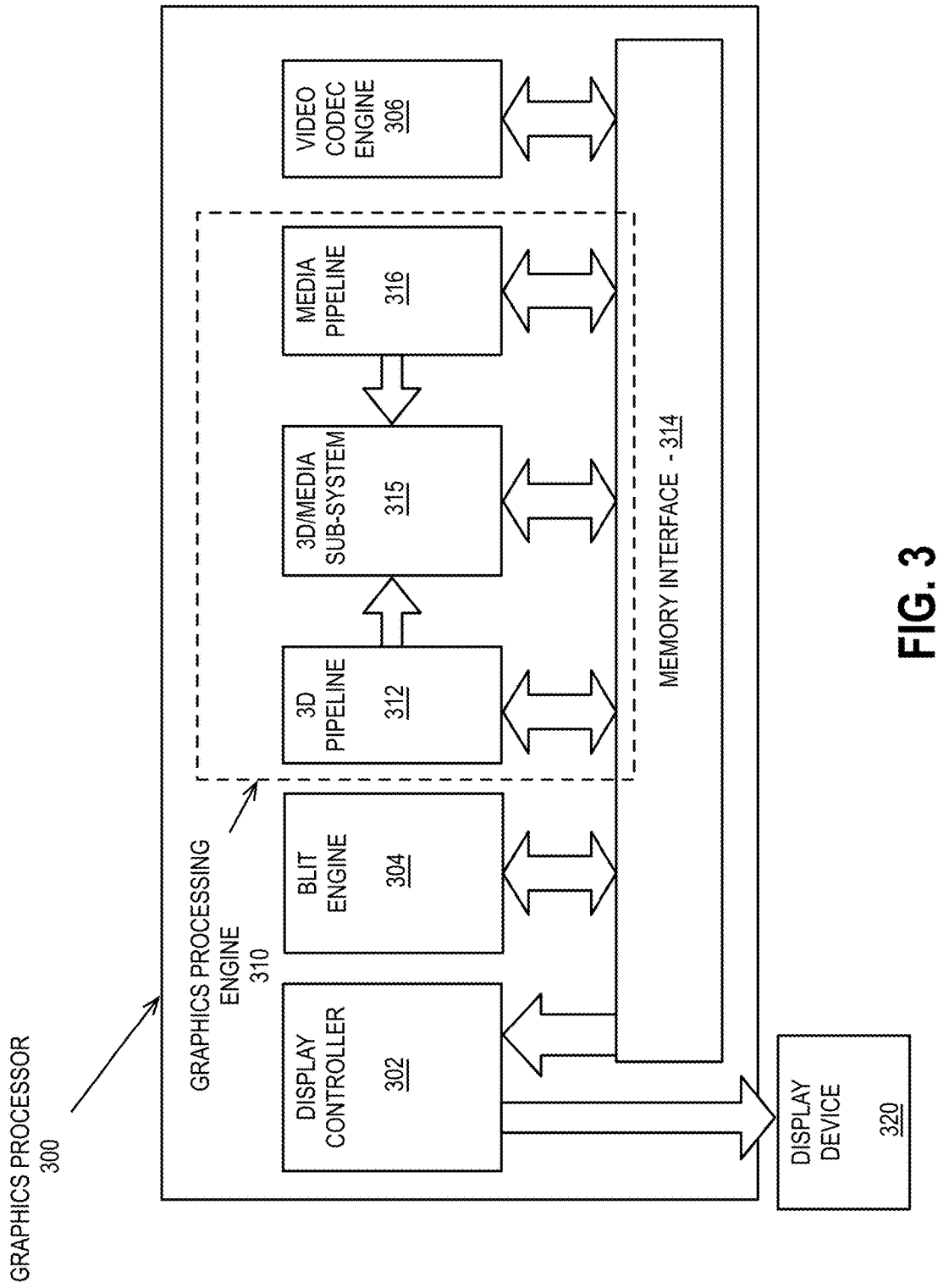
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
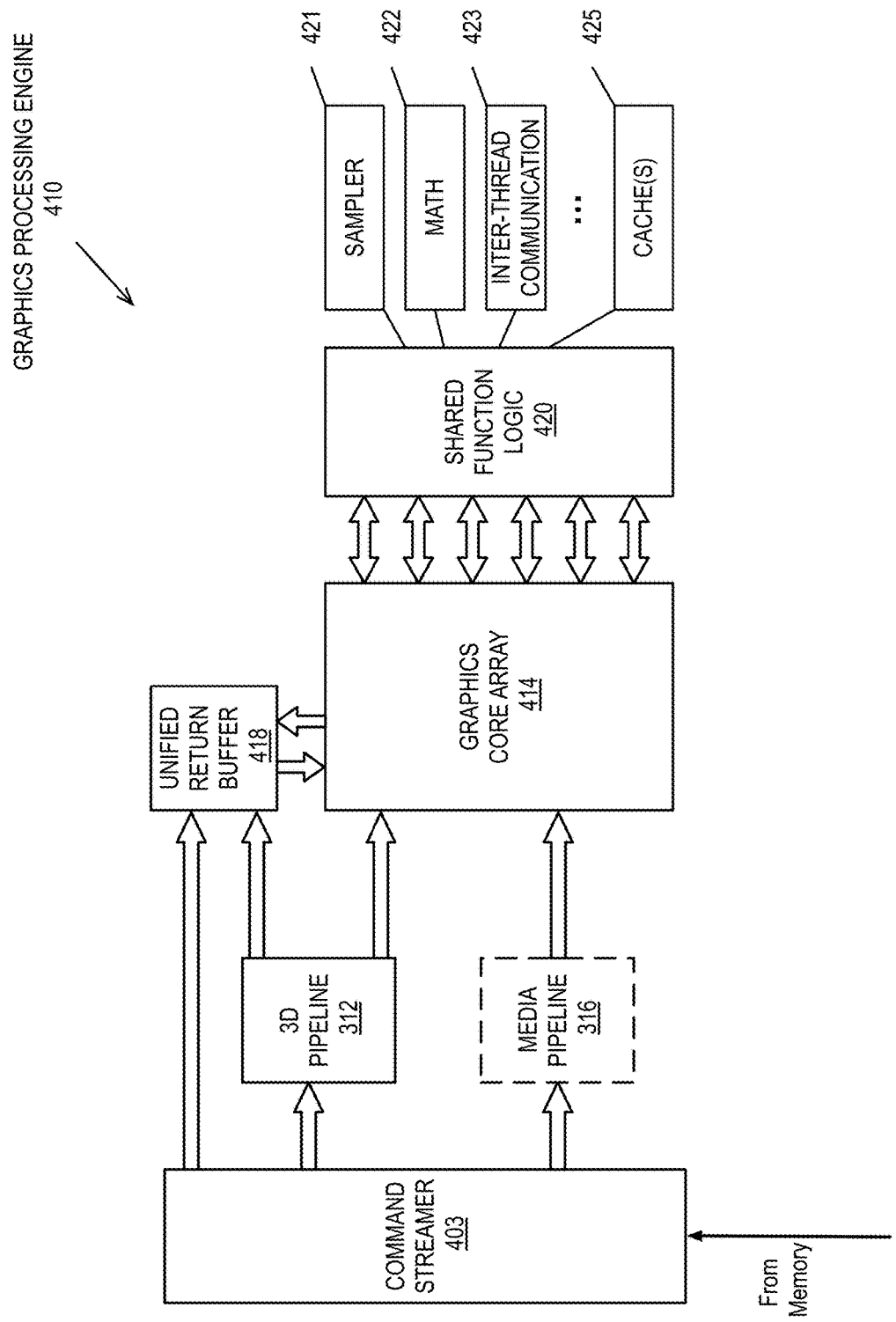
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
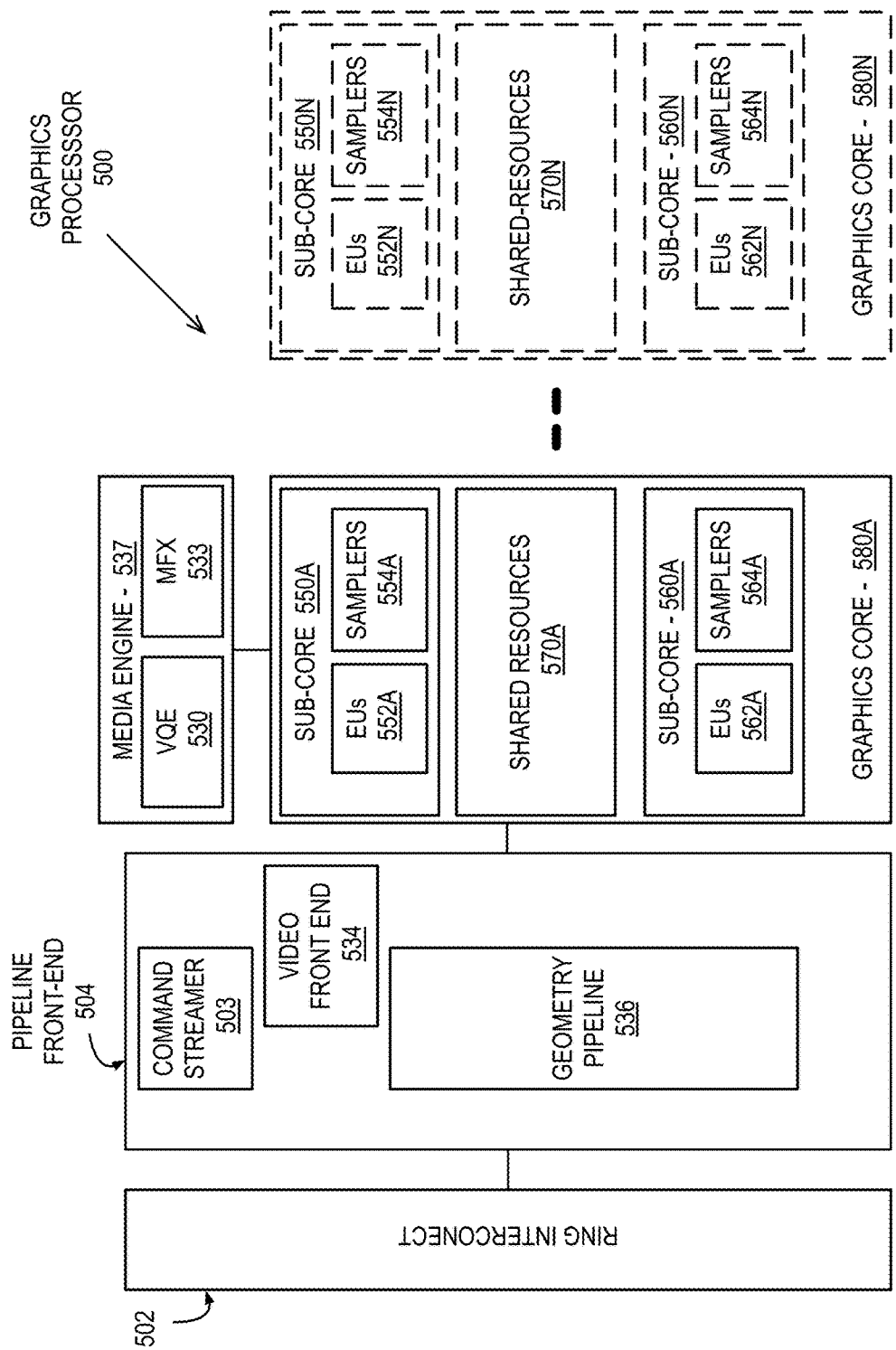
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
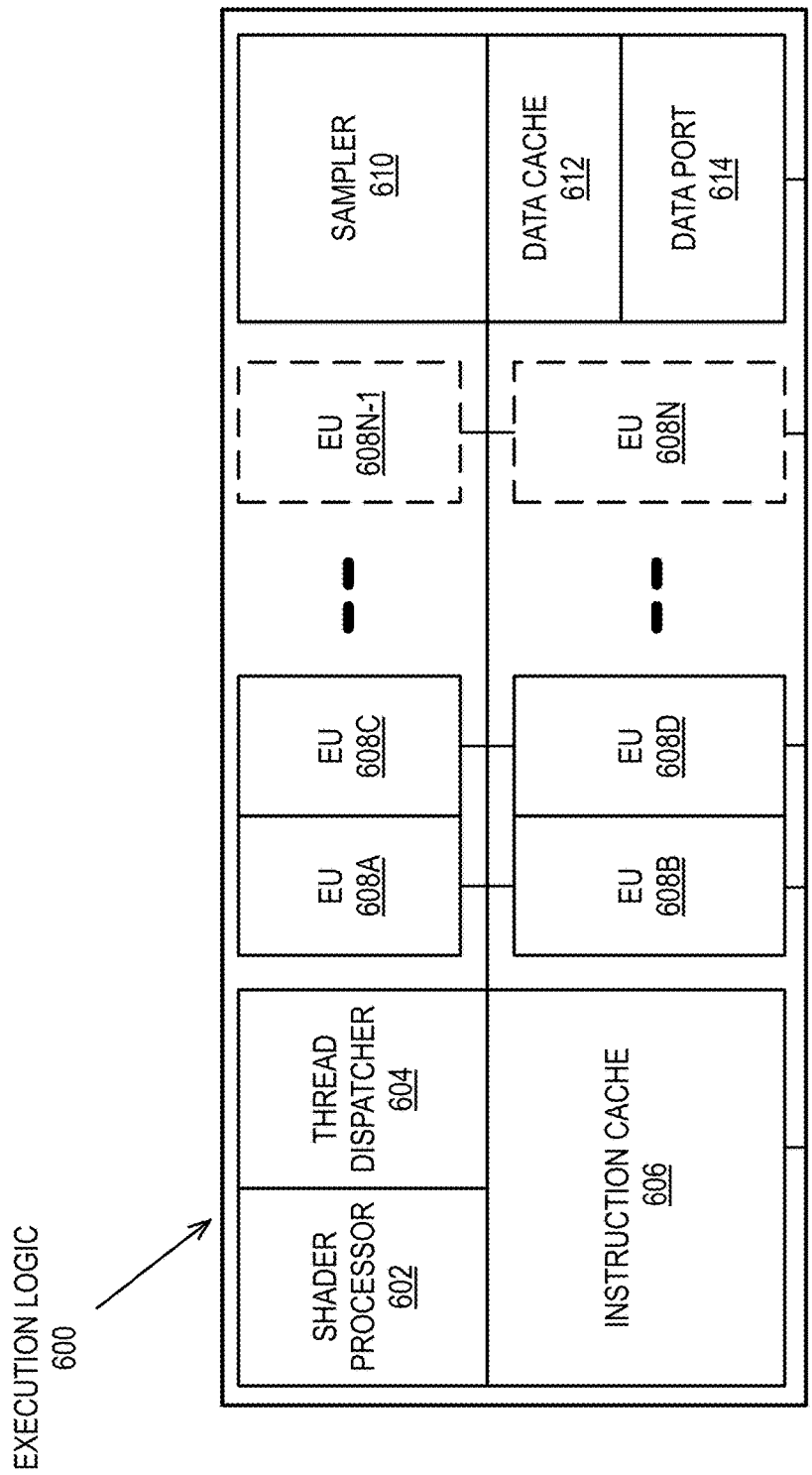
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
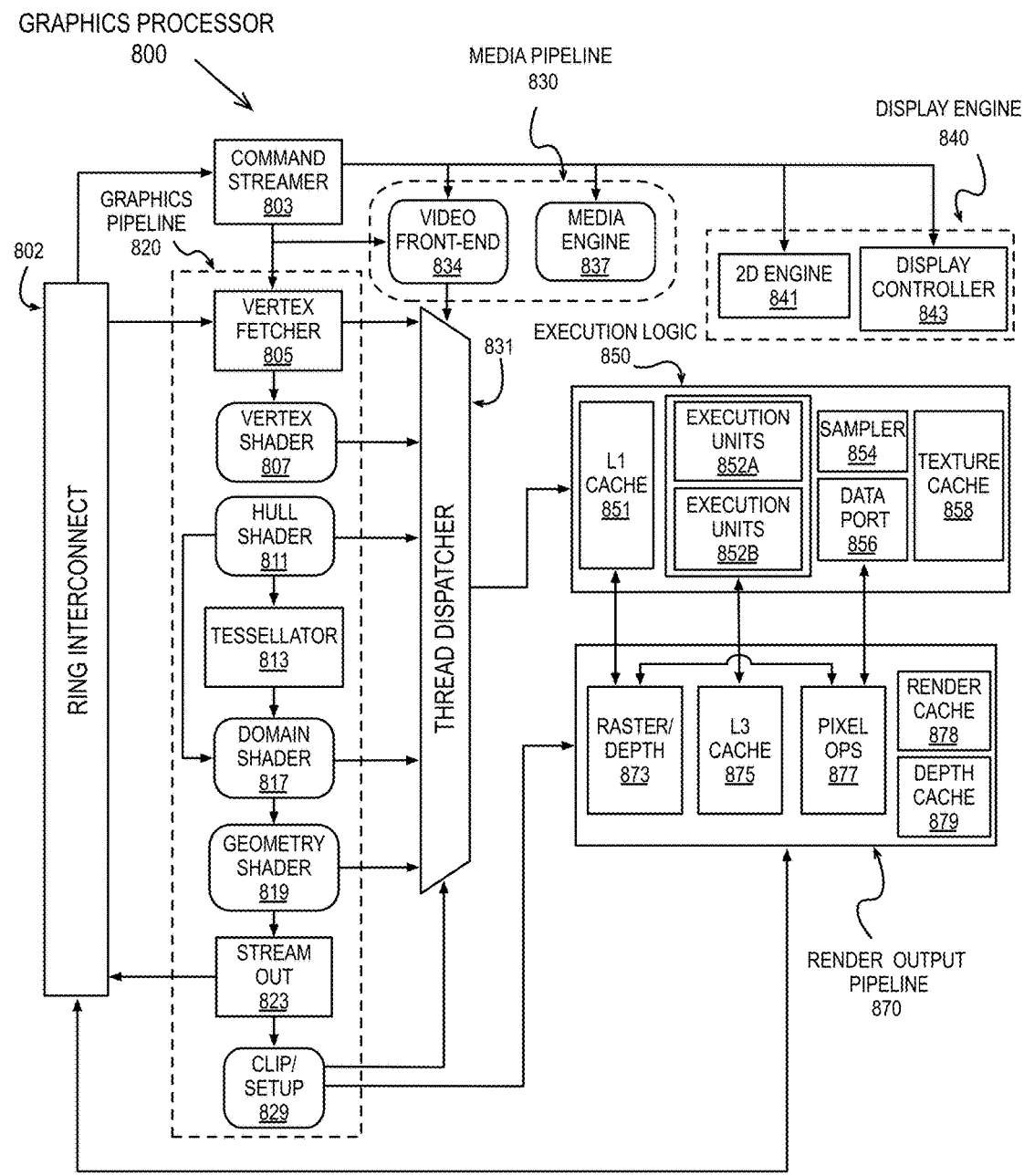
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
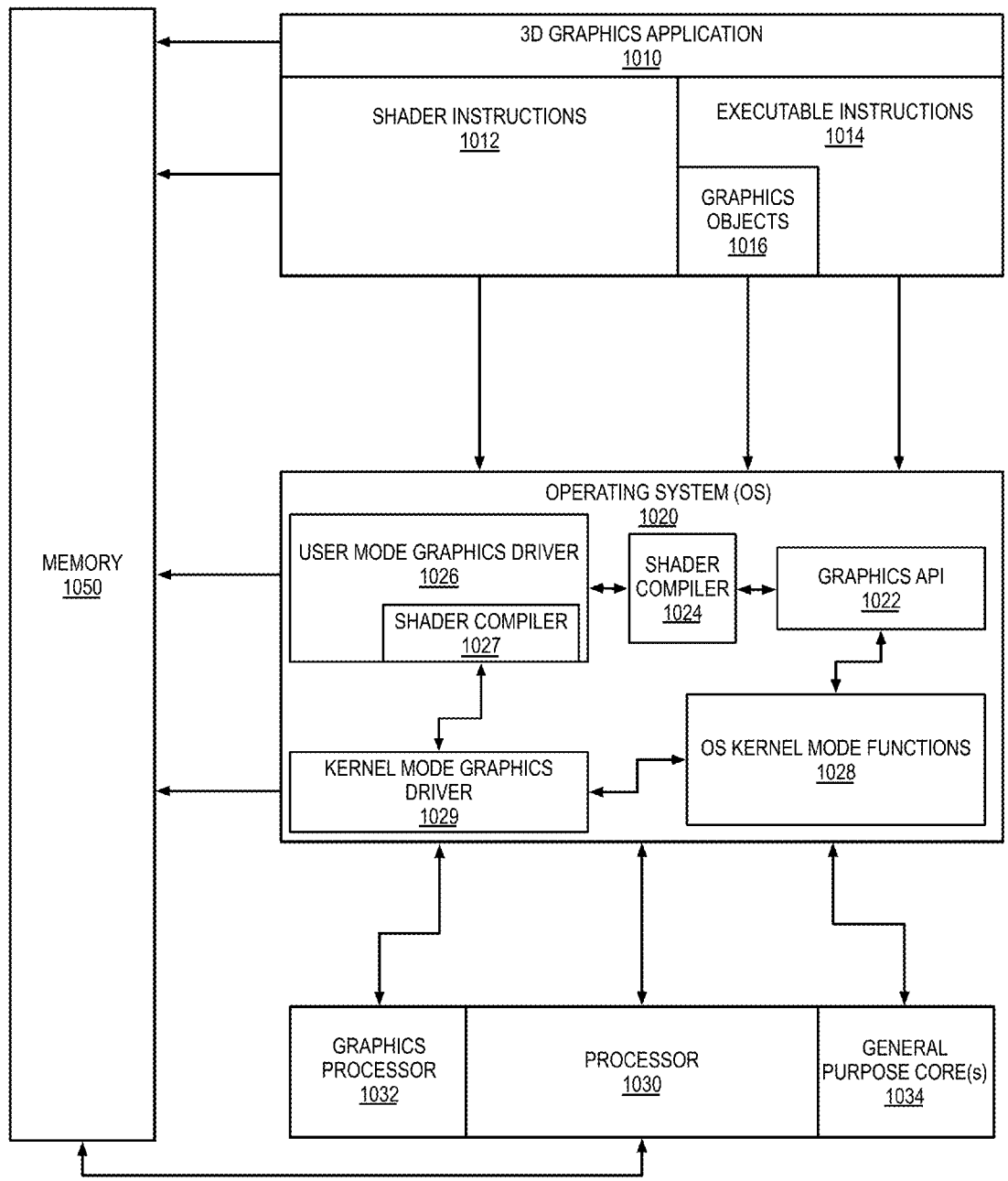
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
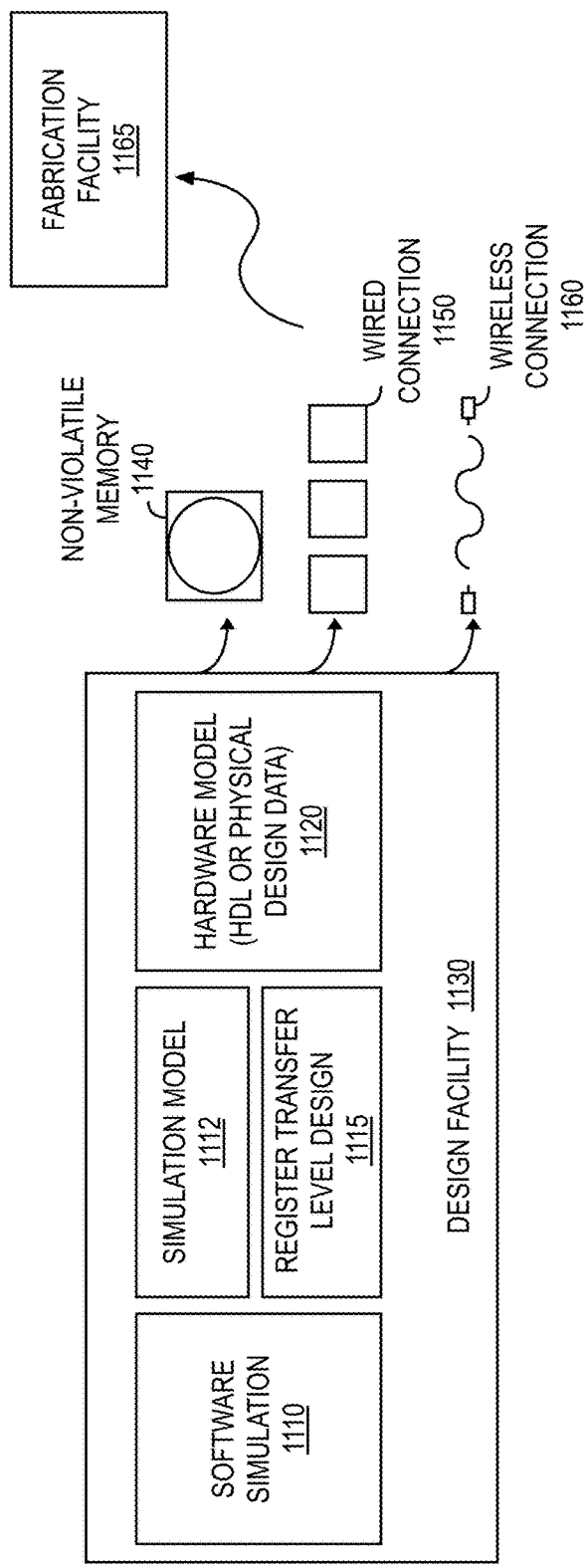
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
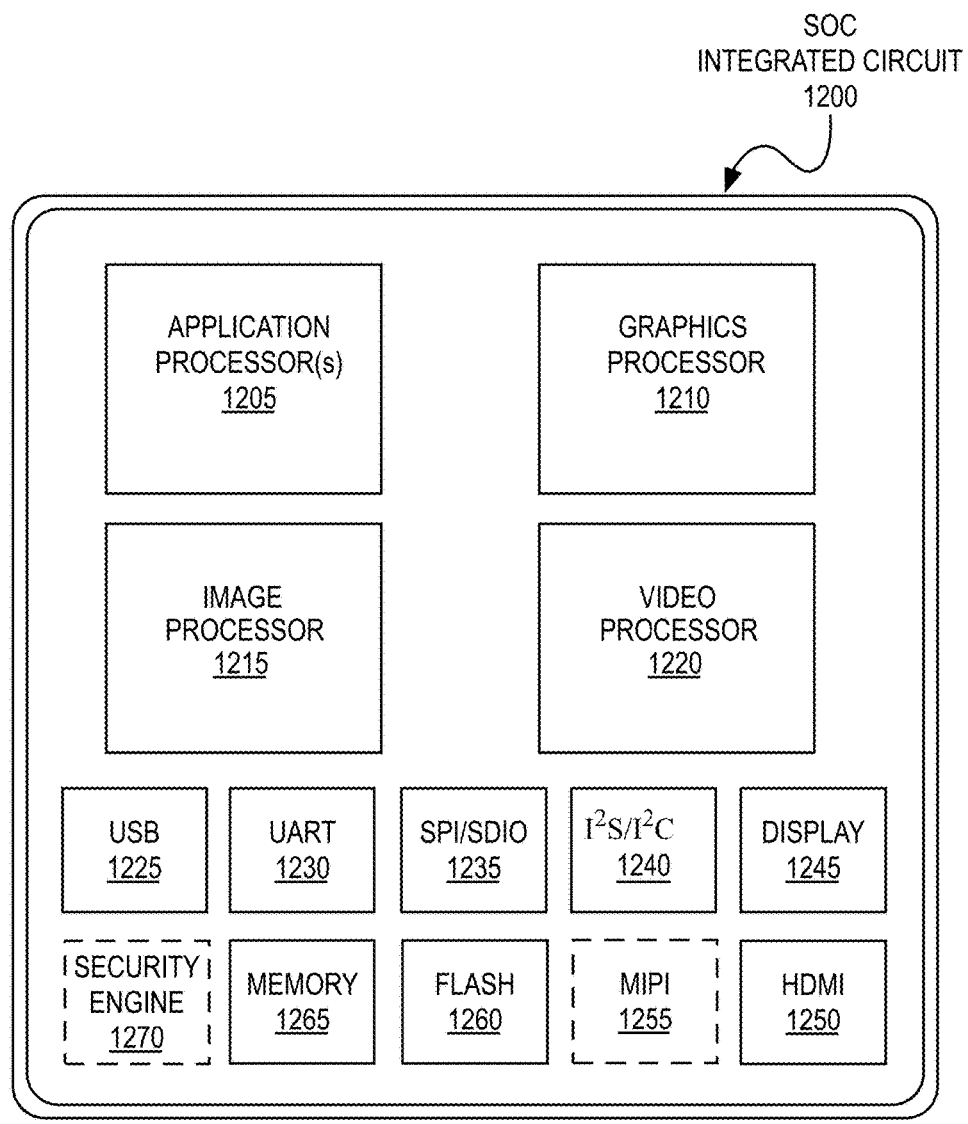
FIG. 12 illustrates an exemplary system on a chip integrated circuit that may be fabricated using one or more IP cores, according to an embodiment.
Figure 13:
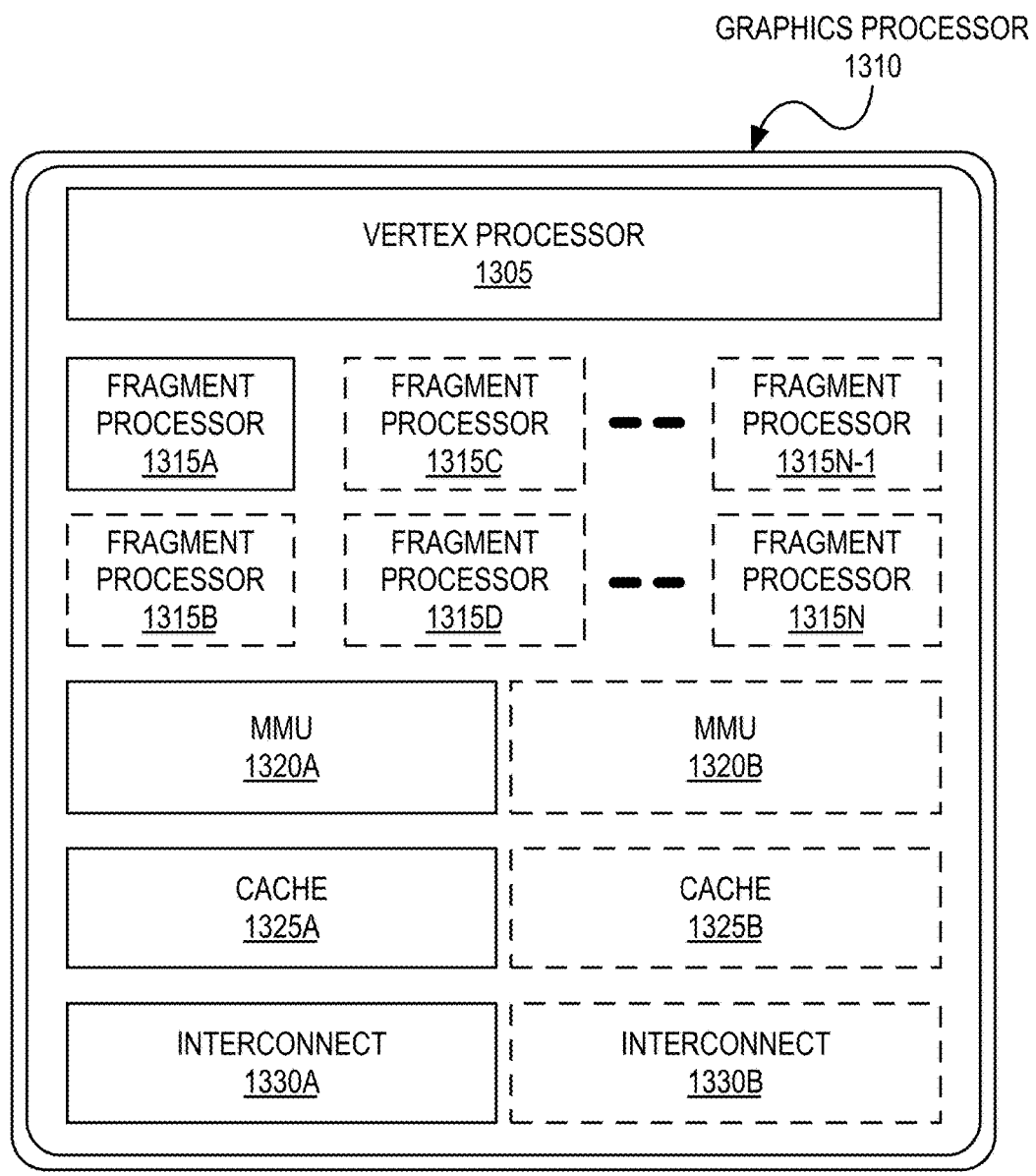
FIG. 13 illustrates an exemplary graphics processor of a system on a chip integrated circuit that may be fabricated using one or more IP cores.
Figure 14:
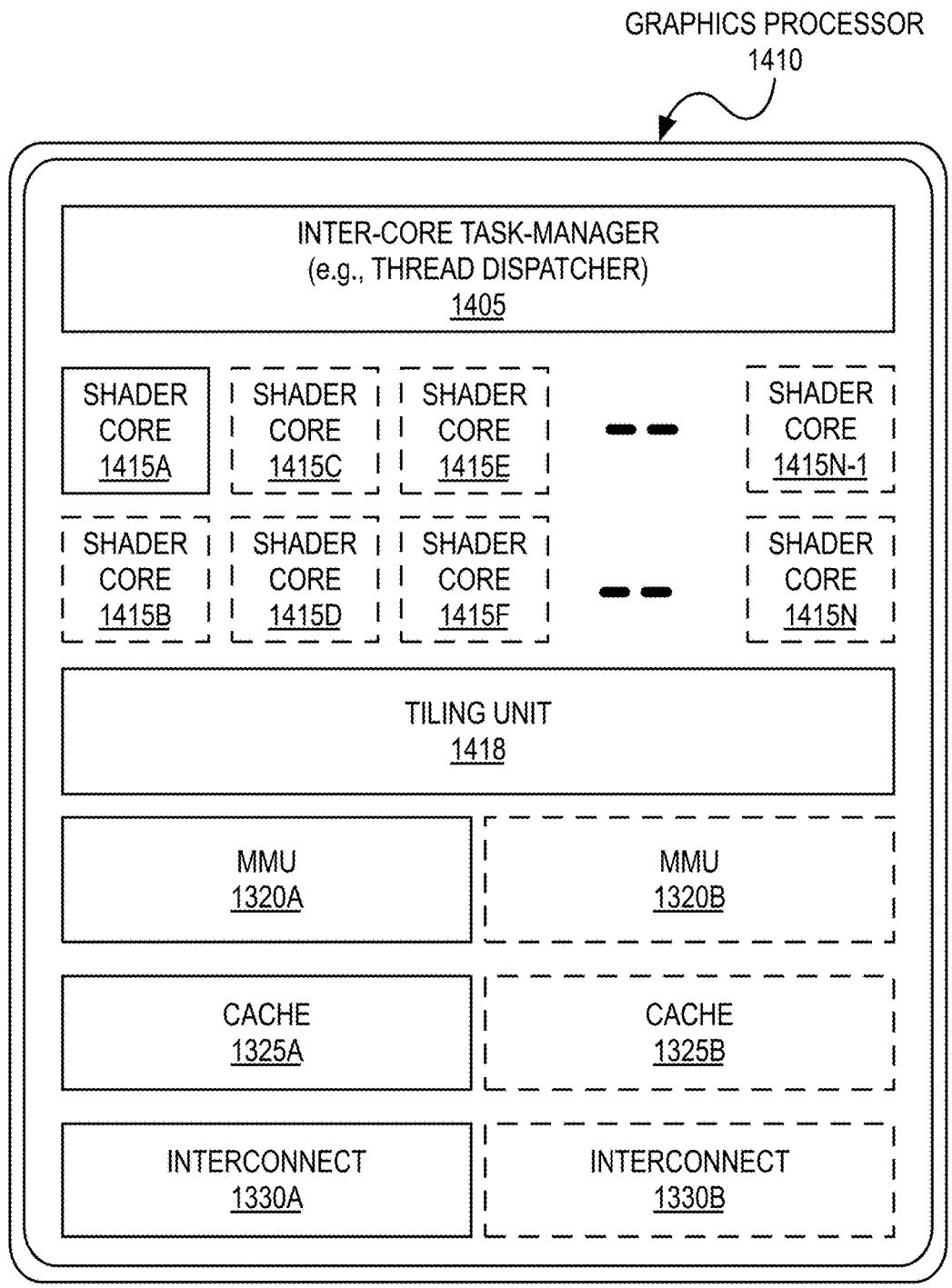
FIG. 14 illustrates an additional exemplary graphics processor of a system on a chip integrated circuit that may be fabricated using one or more IP cores.
Figure 15A:
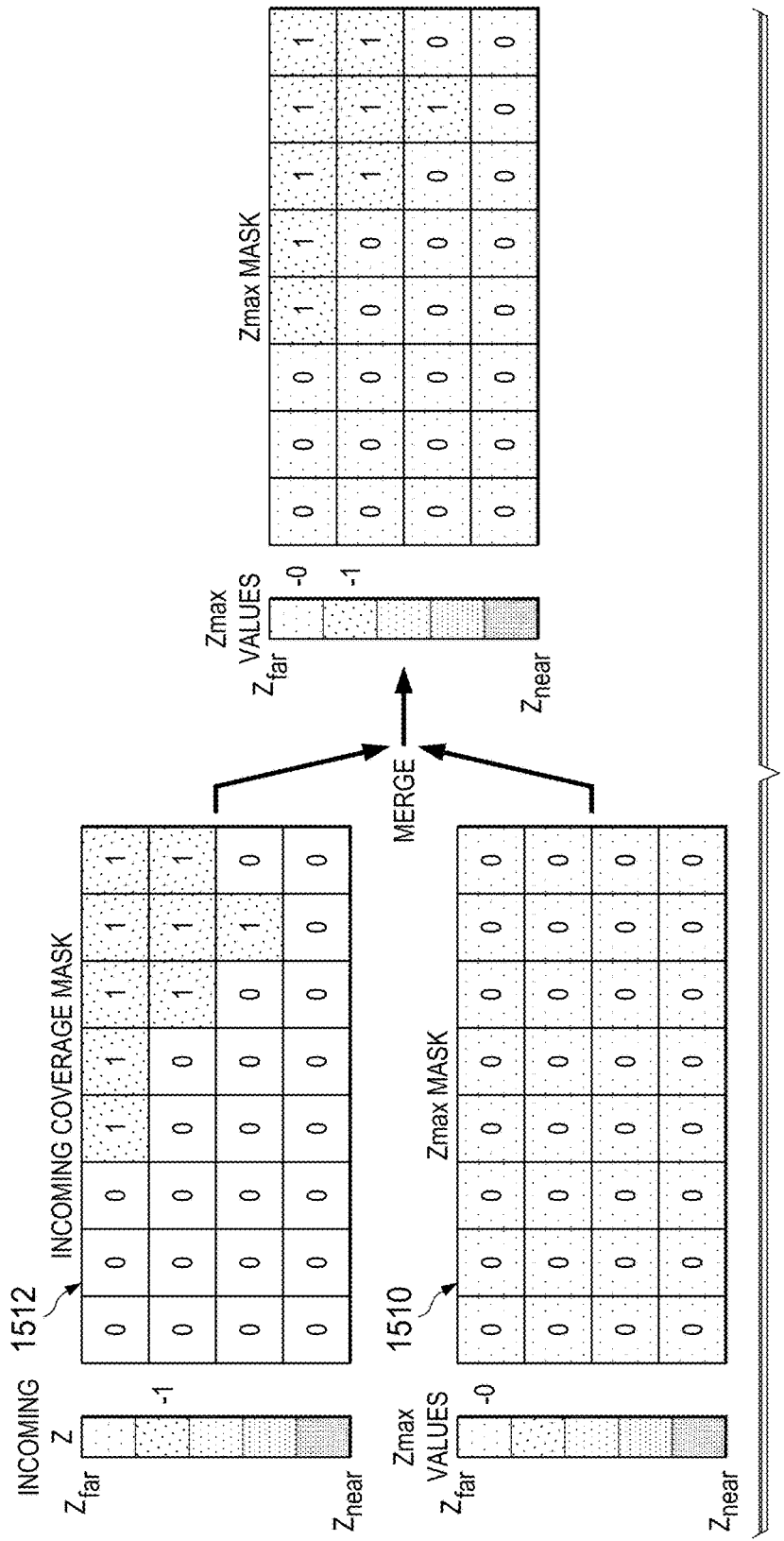
FIGS. 15a-d are depictions of different $z_{max}$ update scenarios.
Figure 15B:
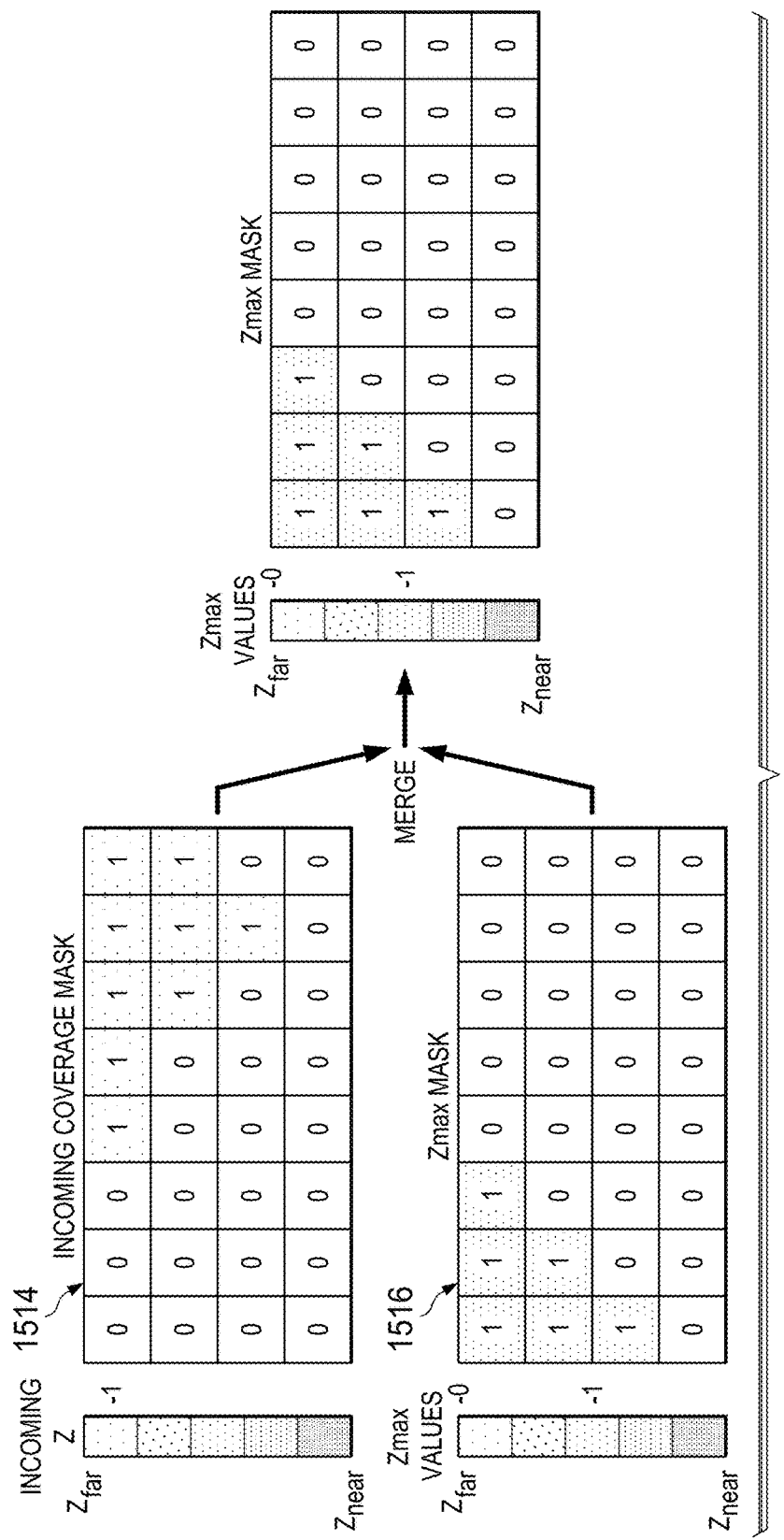
Figure 15C:
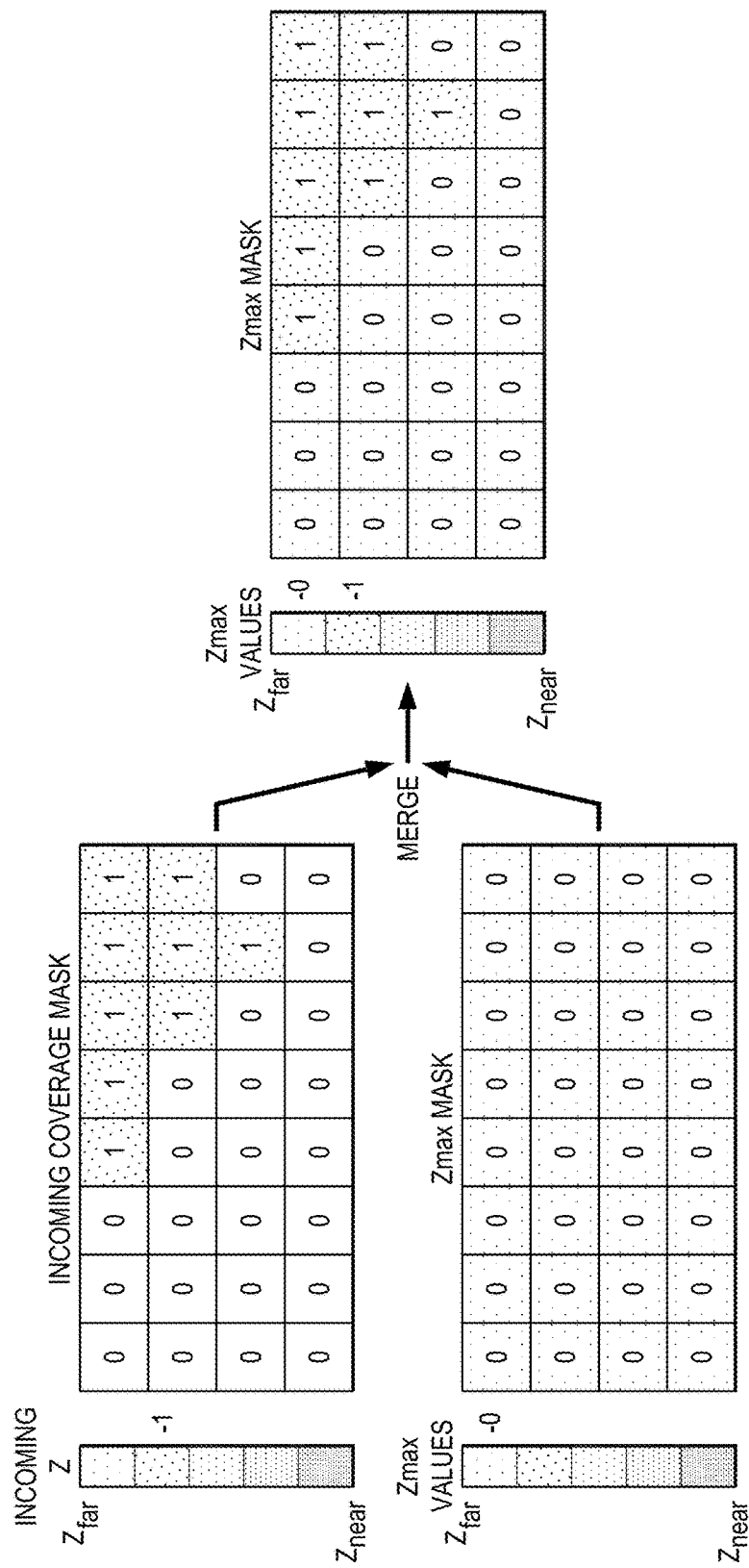
Figure 15D:
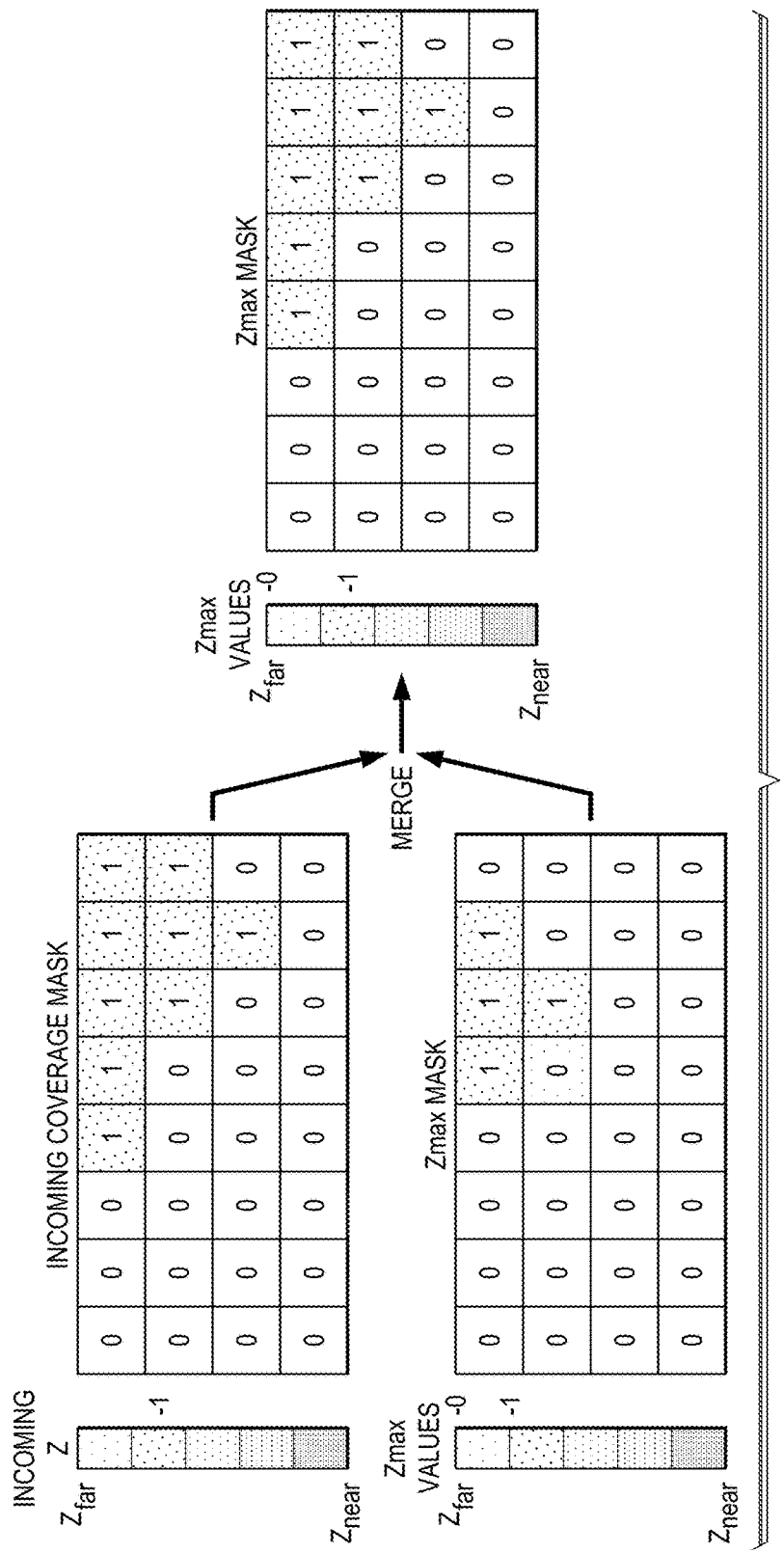

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a frame buffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Method and Apparatus for Efficient Depth Prepass

One embodiment of the invention uses a technique referred to as Zmax-mask occlusion culling, designed by the assignee of the present application. As such, a description of Zmax-mask occlusion culling is provided first, followed by a detailed description of the embodiments of the invention. One embodiment of the invention assumes that Zmax-mask occlusion culling exists in the depth unit of the graphics processor. One advantage of this is that it can generate a very accurate hierarchical depth representation without any feedback or back annotation from the per-pixel depths, which makes it possible to perform the Z-prepass differently. In one embodiment, the processing of triangles (in the Z-prepass) ends after HiZ-processing, meaning that no per-pixel depths will be computed nor will any per-pixel depth testing be performed, thereby significantly reducing memory traffic. In the second pass, depth writes are enabled and a LESS_EQUAL test is used since no per-pixel depths are available when the second pass starts.

Zmax-Mask Occlusion Culling

In one embodiment, two or more $z_{max}$-values are maintained per tile, together with a $z_{max}$-mask, which stores $log_2 n$ bits per depth sample, where n is the number of $z_{max}$-values. In a simple case described herein, only two layers are used, but more layers may be used in other embodiments. This means that each tile stores two $z_{max}$-values. Let us denote them as $z_{max_i}$, $i \in \{0,1\}$. In addition, each depth sample will have a single bit indicating whether that sample uses $z_{max_0}$ or $z_{max_1}$ as its maximum depth. When a triangle is rasterized inside a tile, a coverage mask is generated. The coverage mask has one bit per sample in the tile, and each bit is set to one if it is covered by the triangle and does not unambiguously fail the conservative depth test in the depth culling unit.

Some embodiments have several major advantages. First, certain geometrical cases with thin silhouettes can be handled better than current methods, as explained later. Second, occlusion culling may be done against the $z_{max}$-masked representation, which, in many cases, can be more accurate than current methods that use only a single $z_{max}$ per subtile region. Third, there is no need for a feedback loop from per-sample depths, which means that the algorithm may be fully contained within the depth culling unit. Consequently, a hardware implementation may be much simpler than methods based on depth feedback. In addition, some embodiments can provide more culling for highly tessellated models.

Several scenarios can occur when a triangle is being rendered to a tile. These scenarios are described below.

1. The triangle covers some portion of a tile, and the triangle is in front of the $z_{min}$:s of the tile, and storage (and other) criteria allows the tile to represented in plane mode. In this case, the plane equation of the triangle can be added to a plane encoded representation instead of using $z_{max}$-values and the $z_{max}$-mask.

2. The tile is completely culled, and therefore the processing of the triangle for that tile is finished. Mask-culling is described below.

3. Due to an incoming triangle, a tile cannot be represented as a number of plane equations. In this case, $z_{max}^{tri}$ (and possibly $z_{min}^{tri}$) is computed for the triangle and tile. One of the following events may then occur:

(a) The samples, which are not covered by the triangle, have $z_{max}$-mask bits that are all set to b (either 0 or 1). This means that $z_{max_{(1-b)}}$ is unused and available. Therefore, the $z_{max}$-mask bits for the samples covered by the triangle are set to 1-b, and $z_{max_{(1-b)}}$ set to $z_{max}^{tri}$.

(b) If the $z_{max}$-mask sample bits, which are not covered by the triangle, contain both 0's and 1's, then the three values $z_{max}^{tri}$, $z_{max_0}$ and $z_{max_1}$ are merged into two values, and the $z_{max}$-mask bits for the samples that the triangle covers are updated. Merging strategies are described further in [00140].

(c) If plane mode compression was invoked for a tile in step 1 above, then the tile is in plane mode for a later triangle that partially overlaps the tile. If the incoming triangle partially covers the tile, we set the new coverage mask as the $z_{max}$-mask. The $z_{max_0}$ will then be the max value of the triangles that previously occupied the tile (in plane mode), and $z_{max_1}$ will be set to $z_{max}^{tri}$.

(d) If either all of the 0's or 1's in the $z_{max}$-mask are overwritten by an incoming coverage mask, there is no need to determine which values to merge. The overwritten $z_{max}$-value simply assumes the $z_{max}^{tri}$-value of the incoming triangle, and the mask is updated accordingly.

An example of each of the events listed in scenario 3 is depicted in FIG. 15. In FIG. 15a, the existing triangle 10 in the incoming coverage mask covers the entire tile, so the incoming triangle 12 can simply insert its $z_{max}$-value and update the mask. In FIG. 15b, the tile already has two triangles. Two of the three triangles' $z_{max}$-values must be merged and form a new common mask region. In this case, the incoming 14 and 16 triangles lie closest in depth to each other and are thus merged. In FIG. 15c, the plane representation must be broken, and the existing and incoming triangles are each assigned one $z_{max}$-value and one $z_{max}$-mask bit value. Finally, in FIG. 15d, the incoming triangle covers an existing region in the mask, and simply claims the overwritten $z_{max}$.

Scenario 2 refers to mask culling. Since each tile has a $z_{max}$-mask, and two Zmax-values ($z_{max_0}$ and $z_{max_1}$), it is also possible to perform the occlusion culling against the masked representation. This means that the coverage mask (which is a bitmask with one bit per sample in the tile, and a bit is set to 1 if the triangle covers the samples, and otherwise 0) of the triangle is tested against the index bits. All the index bits together can be thought of as an index bitmask of the same size as the coverage mask. If a bit in the coverage mask is 0, then no culling needs to be done for those samples because the triangle is not covering the corresponding samples. However, for bits in the coverage mask that are set to 1, we need to perform culling against $z_{max_0}$ if the corresponding index bit is 0, and against $z_{max_1}$ if the corresponding index bit is 1.

Another way to put this is that the triangle should be culled against $z_{max_1}$ for the samples whose coverage mask bit AND:ed with the corresponding index bit is 1. Culling against $z_{max_0}$ should be done for the samples whose coverage mask bit AND:ed with the corresponding index bit inverted is 1. This is also expressed in the table below:

| Coverage mask bit | Index bit | Operation |
| --- | --- | --- |
| 0 | X | No culling to be done |
| 1 | 1 | Cull against $z_{max_1}$ |
| 1 | 0 | Cull against $z_{max_0}$ |

Also "cull against $z_{max_{0/1}}$" can be done in different ways. If the per sample depths have been computed, a masked per-sample depth test can be done against $z_{max_0}/z_{max_1}$. Alternatively, one can use the $z_{min}^{tri}$ to cull against the masked $z_{max_0}/z_{max_1}$. The first alternative provides the most accurate way to perform occlusion culling in some embodiments, while the second alternative requires less work as only $z_{min}^{tri}$ needs to be compared to $z_{max_0}/z_{max_1}$ and the coverage mask is updated accordingly. Note that previous $z_{max}$-culling methods only cull against a single $z_{max}$-value per rectangle of samples.

In scenario 3b above, the merge can be done in different ways. In general, there is a set of index bits (one index bit per sample), and $z_{max_0}$, $z_{max_1}$-values stored in the tile, while the incoming data from the triangle consists of a coverage mask and $z_{max}^{tri}$. These three $z_{max}$-values ($z_{max_0}$, $z_{max_1}$, $z_{max}^{tri}$) need to be reduced to two $z_{max}$-values (and stored in $z_{max_0}$ and $z_{max_1}$). In the following we describe three different merging strategies, but one skilled in the art will realize that many other heuristics may be applied.

A. Out of the three values ($z_{max_0}$, $z_{max_1}$, $z_{max}^{tri}$), the two that are closest to each other are merged. The three distances to compare and the resulting $z_{max}$-values is listed below:

| Compared distance | New zMax value if the compared distance is the shortest |
| --- | --- |
| abs(Zmax0−Zmax1) | Zmax0 = max(Zmax0, Zmax1), |

-continued

| Compared distance | New zMax value if the compared distance is the shortest |
|---|---|
| abs(Zmax0-Zmaxtri) | Zmax1 = Zmaxtri<br>Zmax0 = max(Zmax0, Zmaxtri),<br>Zmax1 = unchanged |
| abs(Zmax1-Zmaxtri) | Zmax1 = max(Zmax1, Zmaxtri),<br>Zmax0 = unchanged |

B. This merging strategy is the same as in A, but instead of just comparing $z_{max}^{tri}$, we also compare $z_{min}^{tri}$ to $z_{max_0}$ and $z_{max_1}$. Thus, the comparisons and result $z_{max}$-values become:

| Compared distance | New zMax value if the compared distance is the shortest |
|---|---|
| abs(Zmax0-Zmax1) | Zmax0 = max(Zmax0, Zmax1),<br>Zmax1 = Zmaxtri |
| abs(Zmax0-Zmaxtri) | Zmax0 = max(Zmax0, Zmaxtri),<br>Zmax1 = unchanged |
| abs(Zmax1-Zmaxtri) | Zmax1 = max(Zmax1, Zmaxtri),<br>Zmax0 = unchanged |
| abs(Zmax0-Zmintri) | Zmax0 = max(Zmax0, Zmaxtri),<br>Zmax1 = unchanged |
| abs(Zmax1-Zmintri) | Zmax1 = max(Zmax1, Zmaxtri),<br>Zmax0 = unchanged |

C. This merging strategy counts the 0's and 1's of the index mask that are overwritten by the coverage mask. It is less likely that the overwritten $z_{max}$-value is part of the surface currently being rendered and thus we can disfavor the overwritten $z_{max}$ when merging. While these merging strategies are examples, other variants and combinations are possible and easy to conceive.

Figure 16A:
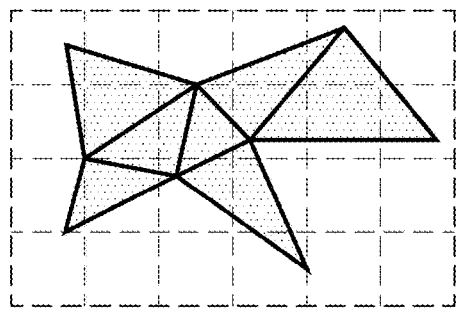
FIGS. 16a-d are depictions of different $z_{max}$ update strategies.
Figure 16B:
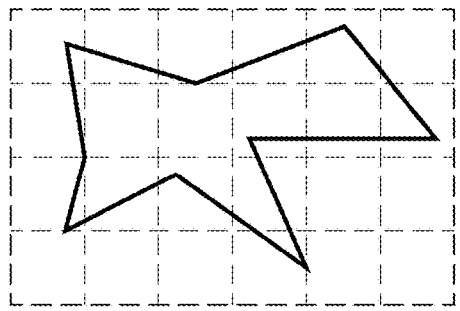
Figure 16C:
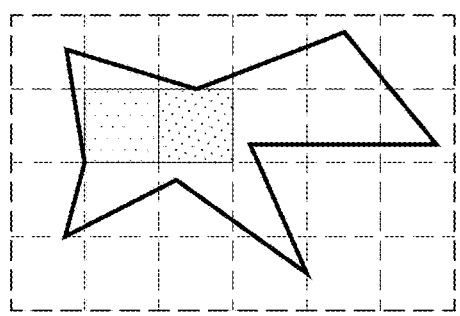
Figure 16D:
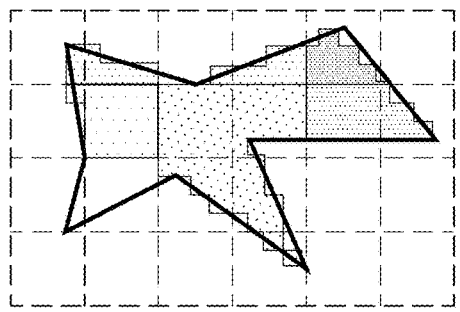

A benefit of having a $z_{max}$-mask for selecting between two $z_{max}$-values is that culling can be done on a per sample granularity instead of on fixed sized(sub-)tiles. This can be particularly beneficial for tiles that contains a geometric silhouette. The improvement in the covered region is illustrated in FIG. 16. Note FIGS. 16b-d show the different $z_{max}$ buffer representations after the mesh in 16a is rendered. In FIG. 16a, the object, consisting of seven triangles, is rendered triangle by triangle to a screen space region consisting of a plurality of tiles. In this example, the tiles are 4×4 pixels each, with one sample per pixel. The gradient illustrates varying depth values, with the darker grey being closer to the camera. In FIG. 16b, the conservative $z_{max}$ update is contained within the depth culling unit. In this example, no $z_{max}$ updates are possible. In FIG. 16c, with feedback from either the depth unit or at cache eviction, the $z_{max}$-values can be recomputed with the samples in the depth buffer. The maximum value for each 4×4 pixel tile is extracted, which is not optimal for silhouette tiles. FIG. 16d shows separating each tile into a foreground and a background $z_{max}$-value, using an embodiment of the invention with the first merging strategy (labeled A).

In practice, the majority of tiles do not contain silhouette edges, but contain instead interiors of objects. Hence, this effect may be small, but can sometimes help culling efficiency.

While only two $z_{max}$-layers have been discussed so far, it is possible to generalize the algorithm to include any number of layers. The proposed merging strategy can easily be reformulated to accommodate this.

Assume that we have a set of n $z_{max}$-values in a tile of size w×h samples. From the current triangle being rendered to a tile, we obtain a conservative $z_{max}^{tri}$-value. From all available z's we form the list: $S = (z_{max_1}, \ldots, z_{max_n}, z_{max}^{tri})$. Similar to before, we have a $z_{max}$-mask, M, with w×h, with entries ranging from [1, n], and a coverage mask, C, of the same size which contains 1's for the samples covered by the incoming triangle, and 0 otherwise. We only have room to store n $z_{max}$-values, and thus we must select two values and merge these to a new, combined entry. This is accomplished through the following steps.

First, merge M and C:

$$M_{ij} = \begin{cases} n+1, & \text{if } C_{ij} = 1 \\ M_{ij}, & \text{otherwise,} \end{cases} \quad (1)$$

$$i \in \{1 \ldots w\}, j \in \{1 \ldots h\}.$$

Next, perform a compaction step where we remove those entries from the list S which have no corresponding entries in the matrix M. The indices are then updated so that no gaps are present. If the list S now has n or fewer entries, the algorithm has completed (i.e. at least one old entry was entirely overwritten).

However, if the list S still has n+1 entries, we must perform a merge using our heuristic. For this we find the minimum distance, $d_{min}$, of any two entries in S and we store their indices (a and b) for later use. Conceptually this process can be described as:

$$d_{min} = \min_{a,b} |S_a - S_b|,$$

$$\text{for } a \in \{2 \ldots n+1\}, \text{ and } b < a,$$

Denote the minimum and maximum indices c=min(a, b) and d=max(a, b). Next, assign $S_c$=max($S_c$, $S_d$) and remove the $d_{th}$ entry from S. All d $z_{max}$-mask bit entries from M may be overwritten:

$$M_{ij} = \begin{cases} c, & \text{if } M_{ij} = d \\ M_{ij}, & \text{otherwise} \end{cases}. \quad (2)$$

Finally, perform the same compaction step as described above in to ensure that contiguous indices are used. Now n list entries in S are assured. The $z_{max}$-values in S and the $z_{max}$-mask M comprises now the new, masked $z_{max}$-representation used for culling.

This entire process may rely only on the data arriving from the rasterizer to the depth culling unit, i.e. no feedback is required in some embodiments. Conversely, there is no restriction to use feedback to improve the $z_{max}$-values.

For multi-sampled anti-aliasing (MSAA), one bit per sample for the $z_{max}$-mask is needed in order to retain the same functionality. This is not particularly expensive. For example, for two layers with 4 samples per pixel (spp), and 4×4 pixel tiles, we need 4·4·4=64 bits for the $z_{max}$-mask.

However, in case this is too expensive still in terms of storage, there are some alternatives. These all reduce the efficiency of culling, however. In the following, assume that 4 spp are used, but this can easily be generalized to any sampling rate. One alternative is to keep only one $z_{max}$-mask bit per pixel, i.e., per 4 samples in this case. For pixels that contain triangle edges, one of the $z_{max}$-values will point to $z_{far}$, which essentially creates a crack in the $z_{max}$-representation. So, for highly triangulated scenes, this will not be that efficient.

In one embodiment, the $z_{max}$-mask scheme may hold a separate clear mask. This means that the cleared z-value may be stored in a separate mask.

Figure 17:
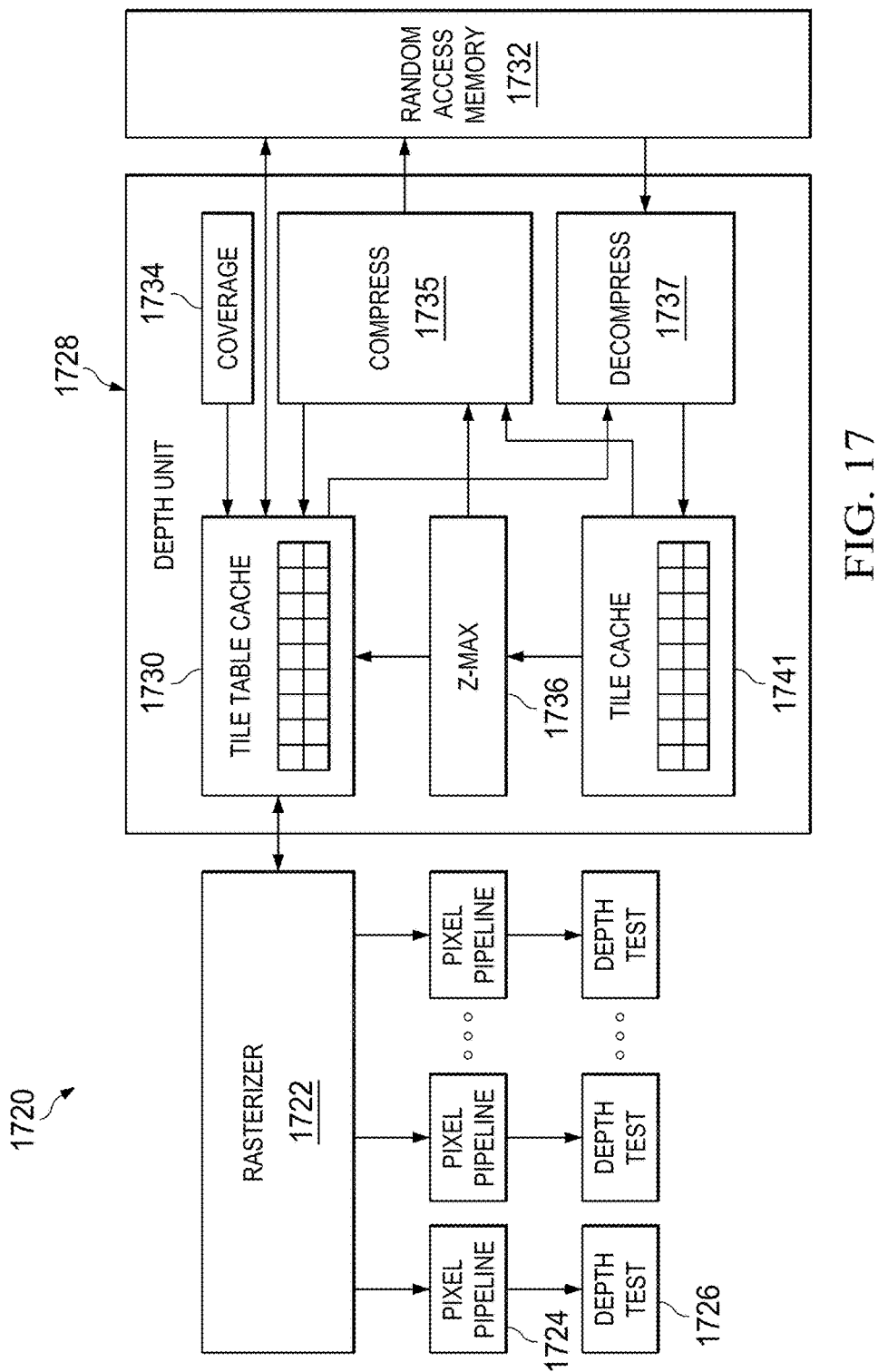
FIG. 17 is a schematic depiction of one embodiment.

Referring to FIG. 17 a depth buffer architecture 1720 includes a rasterizer 1722 to identify which pixels lie within the triangle currently being rendered. In order to maximize memory coherency for the rest of the architecture, it is often beneficial to first identify which tiles (a collection of W×H pixels) overlap the triangle. When the rasterizer finds a tile that partially overlaps the triangle, it distributes the pixels in that tile over a number of pixel pipelines 1724. The purpose of each pixel pipeline is to compute the depth and color of a pixel. Each pixel pipeline contains a depth test unit 1726, responsible for discarding pixels that are occluded by the previously drawn geometry. The depth unit 1728 includes a memory 1732, in one embodiment, that is a random access memory. It also includes a tile table cache 1730 temporarily storing the $z_{max}$-mask representation for each tile and backed by the memory 1732, a tile cache 1741 which is also backed by the memory 1732 and temporarily stores per-sample depth values for rapid access, optionally a $z_{max}$-feedback computation 1736 which updates the $z_{max}$ representation in the tile table 1730 each time a tile is evicted from the tile cache 1741, a compressor 1735, and a decompressor 1737, as well as a coverage mask buffer 1734. The tile table stores the a $z_{max}$ representation and header information, for example one or more flags indicating which compression algorithm is used to compress a tile of depth values, separately from the depth buffer data.

The compressor 1735, in general, compresses the tile to a fixed bit rate and fails if it cannot represent the tile in a given number of bits without information loss. When writing a depth tile to memory, the compressor with the lowest bit rate is typically selected that succeeds in compressing the tile. The flags in the tile table are updated with an identifier unique to that compressor and compressed data is written to memory. When a tile is read from memory, the compressor identifier is read from the tile table and the data is decompressed using the corresponding decompression algorithm 1737. A buffer 1734 may store the coverage mask as well.

Figure 18:
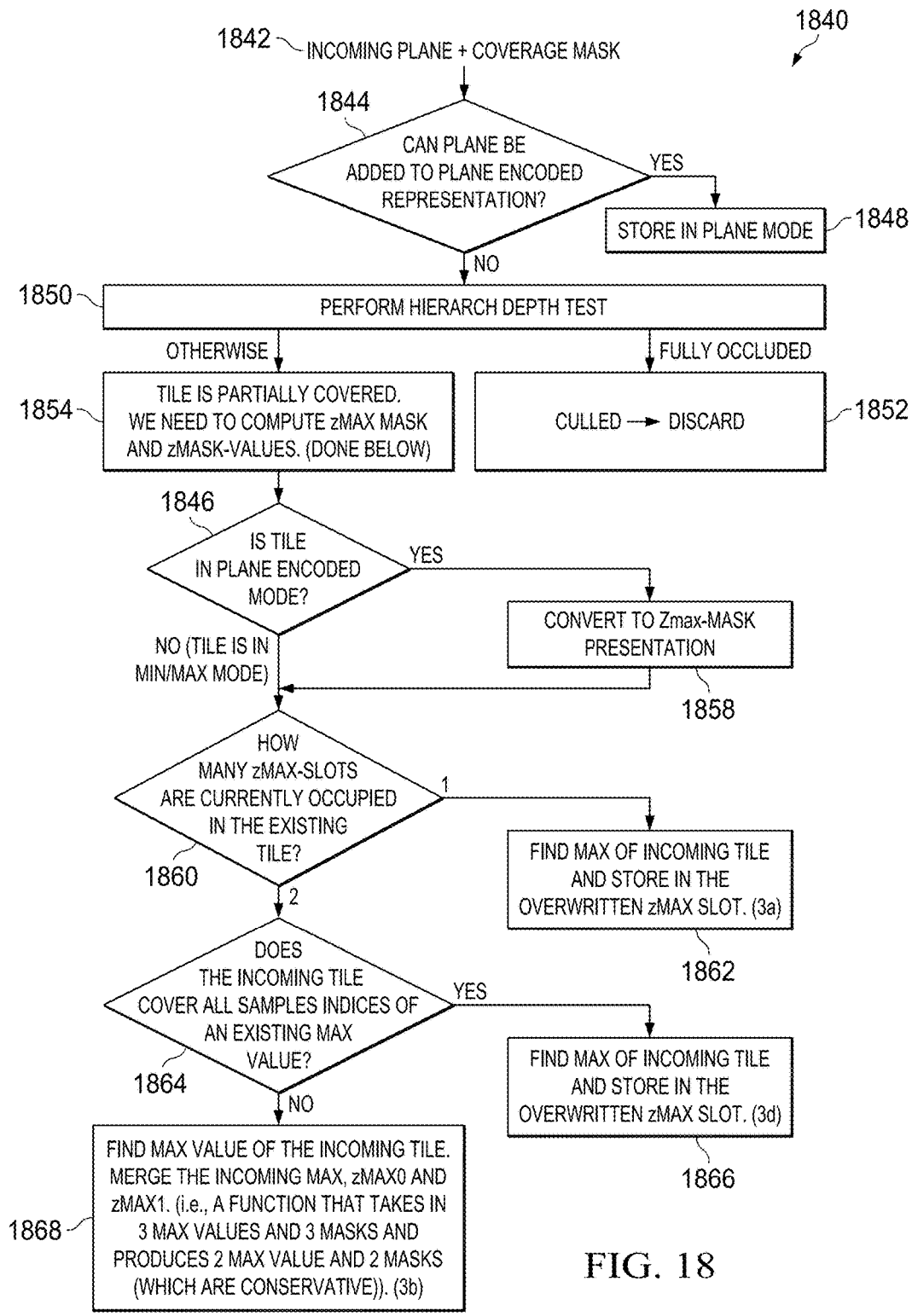
FIG. 18 is a flow chart for one embodiment of the present invention.

A sequence 1840, shown in FIG. 18, may be implemented in software, firmware, and/or hardware. In software and firmware embodiments, it may be implemented by computer executed instructions stored in one or more non-transitory computer readable media, such as magnetic, optical, or semiconductor storages. For example, they may be stored in association with the graphics processing unit.

The sequence 1840 begins by receiving an incoming plane with a coverage mask, as indicated at 1842. A check at 1844 determines whether the plane can be added to the plane encoding representation Otherwise, block 1850 performs hierarchical depth testing. If so, cull and discard (block 1852). If all incoming samples are not covered by the existing tile, the tile is partially covered and a $z_{max}$ mask is computed, together with $z_{max}$ values (block 1854). Then, a check at block 1846 determines whether the tile is in plane mode. If so, the tile is converted to $z_{max}$-mask mode, as indicated in block 1858.

If a tile is not in the plane mode, then the tile is in the min/max mode and it is determined how many $z_{max}$ slots are currently occupied in the existing tile, at block 1860. If it is one, the maximum of the incoming tile is found and stored in the free $z_{max}$ slot (block 1862). If the number of slots is two, then a check at block 1864 determines whether the incoming tile covers all sample indices in an existing maximum value. If so, the maximum of the incoming tile is found and stored in the overwritten $z_{max}$ slot, as indicated in block 1866. If not, the maximum value of the incoming tile is found, as indicated in block 1868. The incoming max, $z_{max_0}$ and $z_{max_1}$, are merged. That is, a function that takes in the three maximum values and the three masks and produces two maximum values and two masks, which are conservative as used.

Apparatus and Method for Efficient Depth Prepass

As mentioned, one embodiment of the invention utilizes Zmax-mask occlusion culling in the depth unit of the graphics processor (e.g., using the techniques described above). One advantage of this is that it can generate a very accurate hierarchical depth representation without any feedback or back annotation from the per-pixel depths, which makes it possible to perform the Z-prepass differently. In one embodiment, the processing of triangles (in the Z-prepass) ends after HiZ-processing. This means that no per-pixel depths will be computed nor will any per-pixel depth testing be performed and no memory traffic to the per-pixel depths will be used. In the second pass, depth writes are enabled and a LESS_EQUAL test is used since no per-pixel depths are available when the second pass starts.

Figure 19:
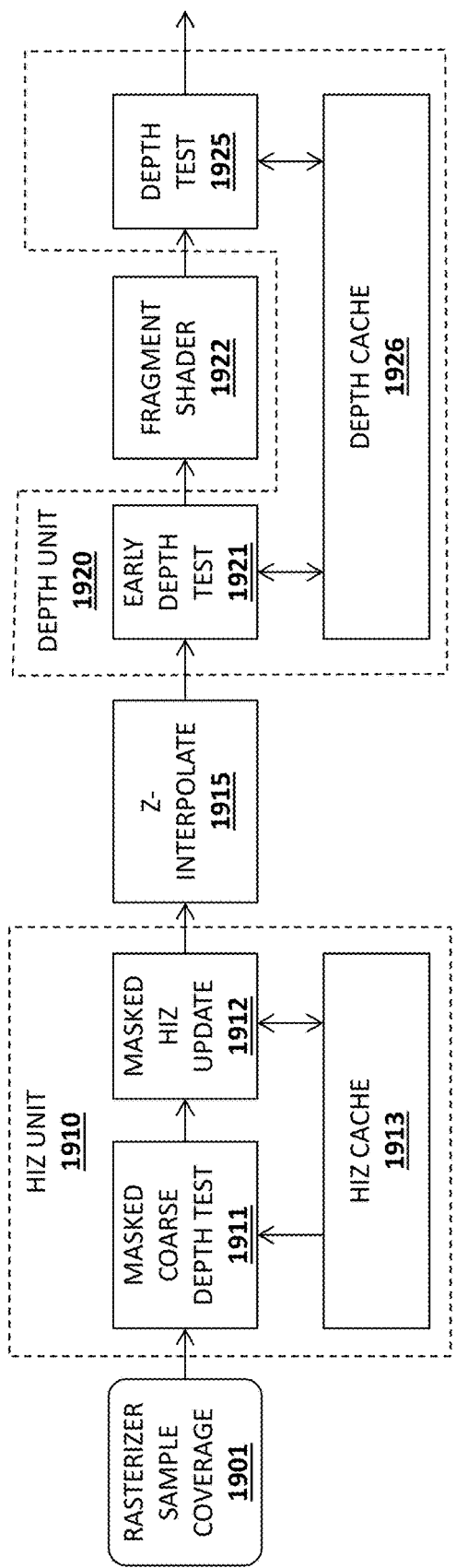
FIG. 19 illustrates an exemplary architecture including an HiZ unit and a depth unit.

FIG. 19 illustrates one embodiment which performs an initial run of the pipeline with only depth rendering on up until the final depth test 1925. At this point, we have an initialized HiZ cache 1913 and a per-pixel depth cache 1926. In a second pass, the illustrated embodiment renders the scene again. This time, much of the geometry will be occlusion culled using the initialized HiZ cache 1913 and per-pixel depths in the depth cache 1926. In the second pass, pixel shading will be performed following the final depth test 1925 for geometry that is not occlusion culled.

Turning briefly to the specific components shown in FIG. 19, the HiZ unit 1910 receives data indicating rasterizer sample coverage 1901 and performs Zmax-mask occlusion culling as described above. In particular, the Zmax-mask representation is used in the HiZ cache 1913 and a masked coarse depth test module 1911 performs a masked coarse depth test using the sample coverage data. A masked HiZ update module 1912 updates the HiZ cache 1913 in accordance with the results of the masked coarse depth test. The Z-interpolation module 1915 then performs interpolation using the depth values.

In the embodiment illustrated in FIG. 19, a depth unit 1920 performs per-pixel depth testing as in prior implementations. The depth data for a triangle being rendered is compared against depth values in a depth cache 1926 by an early depth test module 1921, if early depth testing is possible with the current rendering context. Following the early depth test, a fragment shader 1922 may perform specified shading operations on image fragments (e.g., tiles, pixels). The resulting shaded pixels are then subjected to the final depth test module 1925 which performs pixel depth tests using data from the depth cache, unless the early depth test already has provided a correct depth test result.

Figure 20:
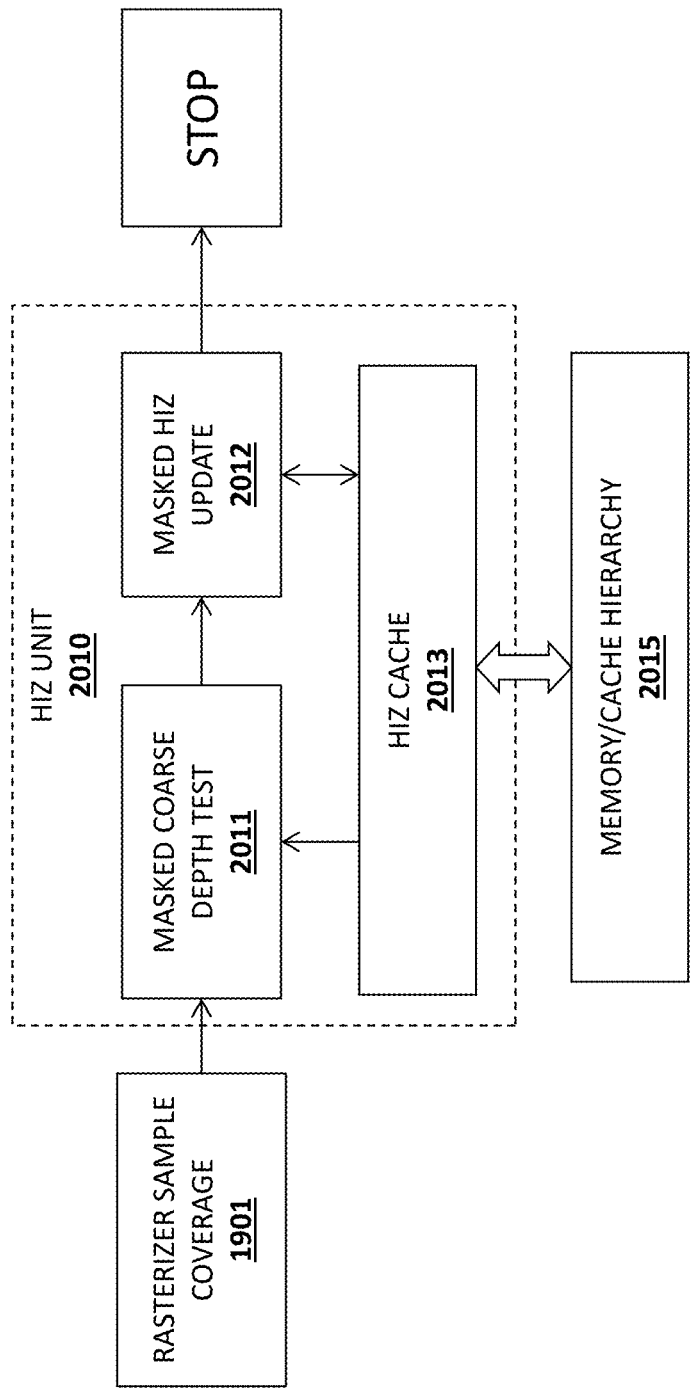
FIG. 20 illustrates one embodiment which performs an efficient Z-prepass with only an HiZ unit 2010.

As illustrated in FIG. 20, in one embodiment of the invention, the first pass of the pipeline is performed with only depth rendering on, but in this embodiment, the first pass ends following the masked coarse depth test module 2011 and masked HiZ update module 2012 (i.e., without performing per-pixel depth operations as in prior embodiments). At this point, HiZ cache 2013 of the HiZ unit 2010 has been initialized and can be used for occlusion culling in subsequent passes. In one embodiment, a Zmax-mask representation, as described above, is used in the HiZ cache 2013. The HiZ-cache 2013 of one embodiment is backed by the rest of the memory/cache hierarchy 2015, so after the Z-prepass, there will be an HiZ-representation (using Zmax-masks) in the memory/cache hierarchy. On the second pass, this time through the full pipeline, the scene is rendered using full rendering as described above with respect to FIG. 19.

Modern graphics APIs support 24 and 32 bit depth values to be stored in the depth buffer. The coarse HiZ cache 2013 typically uses much less memory per sample, and can even be very effective at culling with 2 bits or less per sample. Since the HiZ cache 2013 is so much smaller, maintaining it costs a lot less memory bandwidth than the corresponding depth buffer.

In a standard Z-prepass, in the first pass, the HiZ cache 1913 and depth cache 1926 must be populated, which generates a lot of read and write bandwidth to both caches. In the second pass, reading is only required from the HiZ cache and the Z buffer (though only for the front-most fragments that are actually visible).

With the improved Z-prepass, described with respect to FIG. 20, the same HiZ cache 2013 is generated in the first pass as with the conventional Z-prepass algorithm, but the depth cache 2013 is not modified at all. Note that since there is no depth information in the depth cache 2013, HiZ cache 2013 updates must be computed from coverage and depth information fed to HiZ from the rasterizer using a forward update strategy. In the second pass, this embodiment of the invention utilizes the fact that the HiZ cache 2013 holds most of the culling potential. The coarse HiZ test only needs to read from the HiZ cache but, contrary to the old Z-prepass method, depth writes must be enabled since depth testing must be exact and the HiZ test outcome can be ambiguous. This only introduces a small overhead, however, compared to the significant bandwidth savings gained from not having to populate the depth buffer in the first pass.

Figure 21:
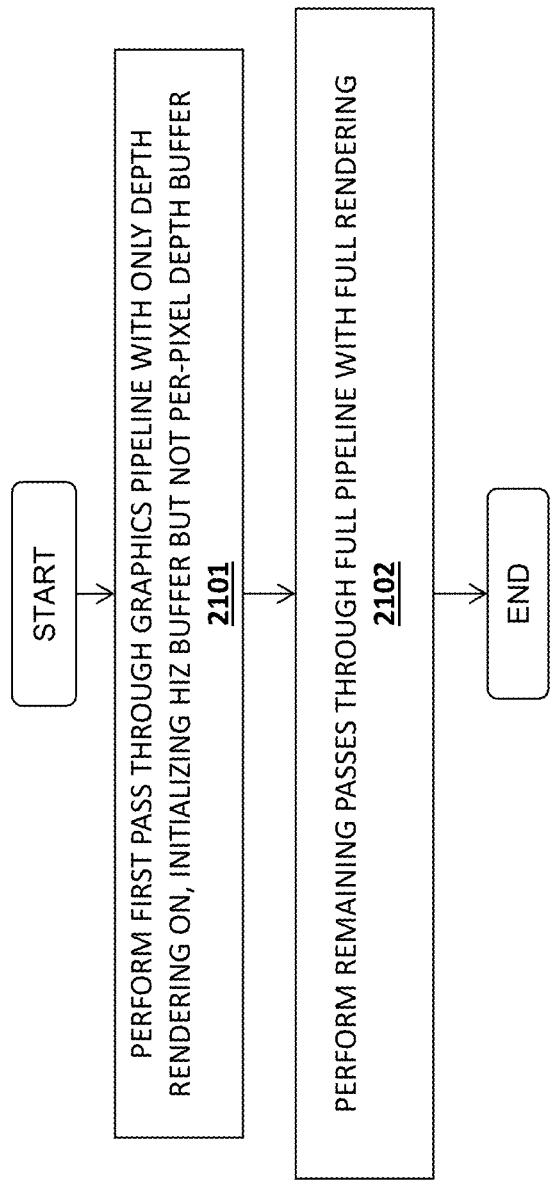
FIG. 21 illustrates a method in accordance with one embodiment of the invention.

A method in accordance with one embodiment of the invention is illustrated in FIG. 21. The method may be implemented within the context of the system architectures described above, but is not limited to any particular system architecture.

At 2101, a first pass through the pipeline is performed with only depth rendering on, initializing the HiZ buffer but not the per-pixel depth buffer. That is, the first pass is not performed through the depth buffer/cache 1926 to conserve processing resources. At 2102, once the HiZ buffer is initialized, the remaining passes through the graphics processing pipeline are performed with full rendering.

In one embodiment, the techniques described herein require that promoted Z is active. That is, neither depth output nor discard operations can be used in the pixel shader. If a draw call does any of these operations, they may be skipped and still get a conservative HiZ buffer.

The Z-prepass techniques described above may be used together with the techniques described below in the section entitled "Occlusion Query Apparatus and Method for Accelerated Rendering." Approximate occlusion queries may be used to cull entire draw calls based on the (approximate, but conservatively computed) visibility of a proxy geometry. It is approximate since it only compares to the HiZ buffer and classifies ambiguous HiZ test outcomes as "visible". The query should be kept as light weight as possible, in terms of both compute overhead and bandwidth usage. With the Z-prepass techniques described above, the HiZ buffer may be provided quickly and at a low bandwidth cost for such queries, without having to also build the depth buffer Occlusion Query Apparatus and Method for Accelerated Rendering The embodiments of the invention further improve rendering performance in combination with occlusion queries. In particular, one embodiment of the invention records a bitmask when performing an occlusion query, where one bit per tile (e.g., a tile of 8×8 pixels) is stored. During the occlusion query the bitmask is initialized so that each bit indicates whether the proxy is fully occluded in that tile. The bitmask is used later, when rendering the detailed geometry (i.e., the contained draw call), to efficiently remove work in tiles where we know the detailed geometry will be fully occluded.

These embodiments of the invention provide significantly improved performance for partly occluded objects, in which case both rasterization and HiZ testing can be skipped in the occluded tiles. Prior techniques cannot provide any benefit in such cases. Fully occluded objects may still be removed by standard occlusion queries. For entirely visible objects, the HiZ test can potentially be skipped. As mentioned, HiZ is the Hierarchical Z buffer, a low-resolution copy of the Z buffer which may be used for lower granularity depth operations, resulting in computational and bandwidth savings.

Figure 22:
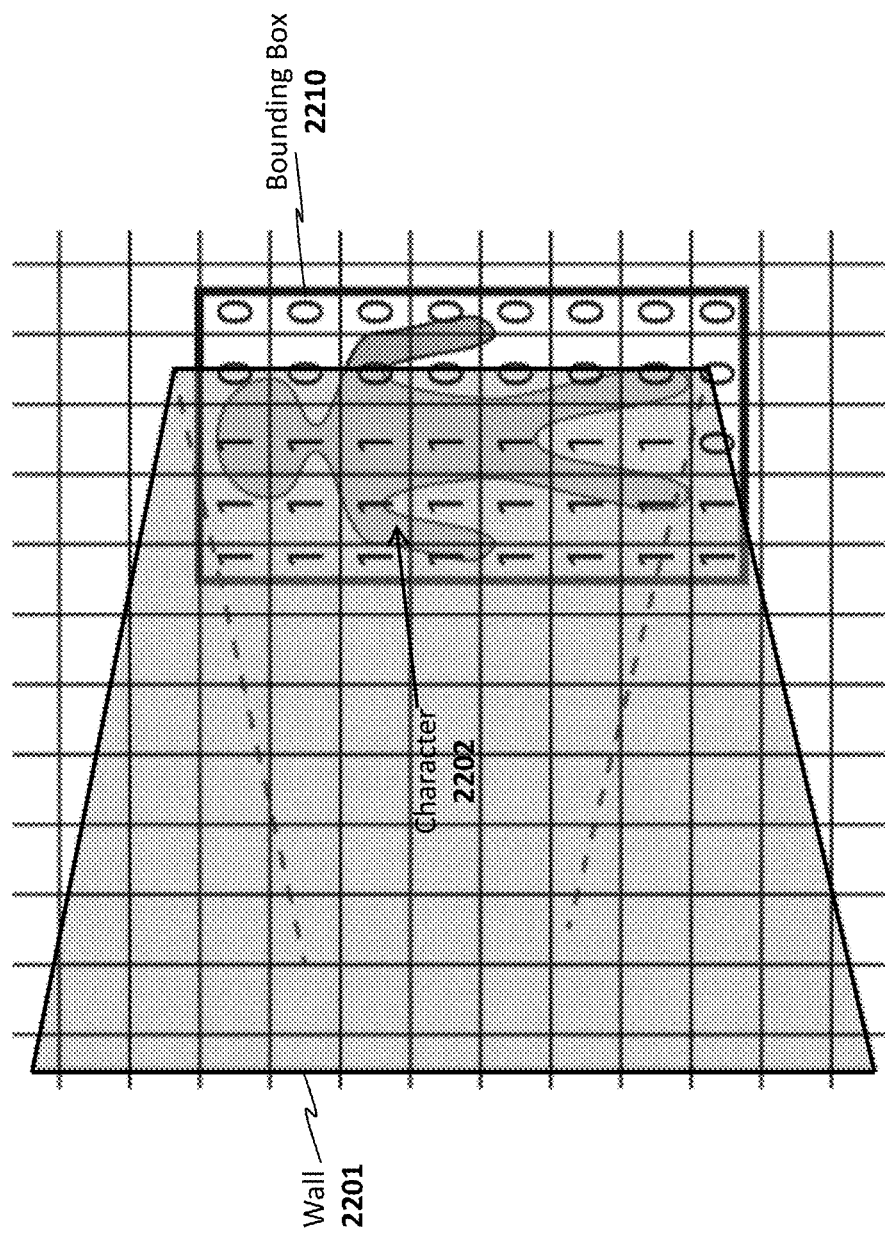
FIG. 22 provides an example showing how a bit is assigned per tile to indicate whether the tile is fully occluded.

FIG. 22 illustrates an example to describe the operation of one embodiment of the invention. A wall 2201 has been rendered first followed by a complex character model 2202 rendered in a subsequent draw call. Before rendering of the character 2202 starts, however, an occlusion query is issued using the bounding box 2210 of the character to determine whether it is completely occluded by the wall 2201. If so, the entire draw call may be omitted.

In this example, however, the character 2202 is only partially occluded by the wall 2201. With existing occlusion queries, the entire character would need to be rendered because the bounding box is not fully occluded.

In contrast, one embodiment of the invention avoids processing the portions of the character 2202 which are occluded. In this embodiment, the occlusion query generates a bit per tile (shown as 0's and 1's in the figure). When the contained draw call is rendered, these bits may be used when rasterizing, HiZ-testing, and depth testing in each tile per triangle. For example, if rasterization is done hierarchically down to a tile with a 1 in it, indicating a fully-occluded tile, then that tile does not need to be fully processed for that triangle, resulting in performance improvements and power savings.

As mentioned, the standard occlusion query type SAMPLES_PASSED counts the number of fragments that pass when rendering the proxy geometry. This can be very useful for some algorithms but for occlusion culling, all that is needed is whether the object is fully occluded because it is only then that rendering the entire object can be skipped. To that end, several other types of occlusion queries have been introduced. For example, ANY_SAMPLES_PASSED exits the occlusion query as soon as one fragment passes the depth test, because then it is known that the proxy geometry is NOT fully occluded. Another type is ANY_SAMPLES_PASSED_CONSERVATIVE, which may work on a per-tile (e.g., 8×8 pixels) level and can make use of the hierarchical depth test which indicates that geometry is visible in a tile or any other method that as long as it is conservative, i.e., it does not return occluded for a (partially) visible object.

One embodiment of the invention works not only for standard predicated occlusion queries, but also for approximate tests which are not "any fragments pass" tests. Hence, it may be appropriate to introduce a new type of occlusion query.

One embodiment reuses the information learned from the occlusion query when the predicated draw call is processed. In particular, the occlusion query is extended so that it creates a bitmask, with one bit per tile inside the geometry (bounding box) of the occlusion query. The bit is set to 1 if the proxy geometry (bounding box in the example in FIG. 22) is fully occluded inside that tile, and 0 otherwise.

The per-tile bit value can be obtained by the aggregate sample tests within each tile, or, in the case of ANY_SAMPLES_PASSED_CONSERVATIVE, a single tile test. The difference of these two approaches is explained below:

Per-tile testing: The tile test is the approximate and conservative query result that is obtained when the geometry proxy is compared to the contents of the HiZ buffer. Each HiZ entry corresponds to a tile of pixels in the depth buffer and the tile test occurs when the geometry of the proxy is rasterized and compared to the HiZ for a particular tile. The result of each tile test may be fully visible, fully occluded, or ambiguous. Fully occluded tiles are recorded with a 1 in the bitmask, and with a 0 otherwise.

Per-sample testing: For standard occlusion queries (SAMPLES_PASSED and ANY_SAMPLES_PASSED), a HiZ test is first done per tile. If the proxy geometry is occluded, that tile is not further processed, and our invention will set the per-tile bit to 1 to indicate occlusion in that tile. If not, per-pixel processing continues, and if all fragments in a tile are occluded, the per-tile bit will again be set to 1 to indicate occlusion. Otherwise, we set the bit to 0. The default value is assumed to be 0, since if we have ANY_SAMPLES_PASSED, then the testing will abort as soon as one fragment is visible. However, we can still exploit all the bits that have been set to 1 before that happens during rendering of the geometry (i.e., not proxy).

If the entire bounding box cannot be culled, one embodiment of the invention feeds that bitmask to the rasterizer and HiZ-unit when the corresponding geometry (drawcall), e.g., an entire character, is being rendered. The rasterizer can refrain from processing tiles that are known to be occluded from the predicated occlusion query. This behavior is possible thanks to the occlusion information that is stored in the bitmask. Current solutions require processing the entire draw call for the detailed geometry, and we believe our invention may provide a generous speedup as we can save rasterization and HiZ testing costs for fully occluded tiles.

Both ANY_SAMPLES_PASSED and ANY_SAMPLES_PASSED_CONSERVATIVE have boolean outcomes. As an optimization, it is therefore possible to terminate the query early if a visible fragment is encountered. If this early termination is employed, we might not obtain information about occlusion in all tiles, which is detrimental to the performance of our algorithm. It would, however, be possible to refrain from early termination if partial occlusion of drawcalls is common.

Alternatively, new occlusion query modes could be introduced, which explicitly perform the entire query in a conservative manner (ANY_SAMPLES_PASSED_CONSERVATIVE) or in the exact manner (ANY_SAMPLES_PASSED). Note that rendering the proxy geometry is likely far less expensive than the draw call it predicates, so this should pay off.

Figure 23:
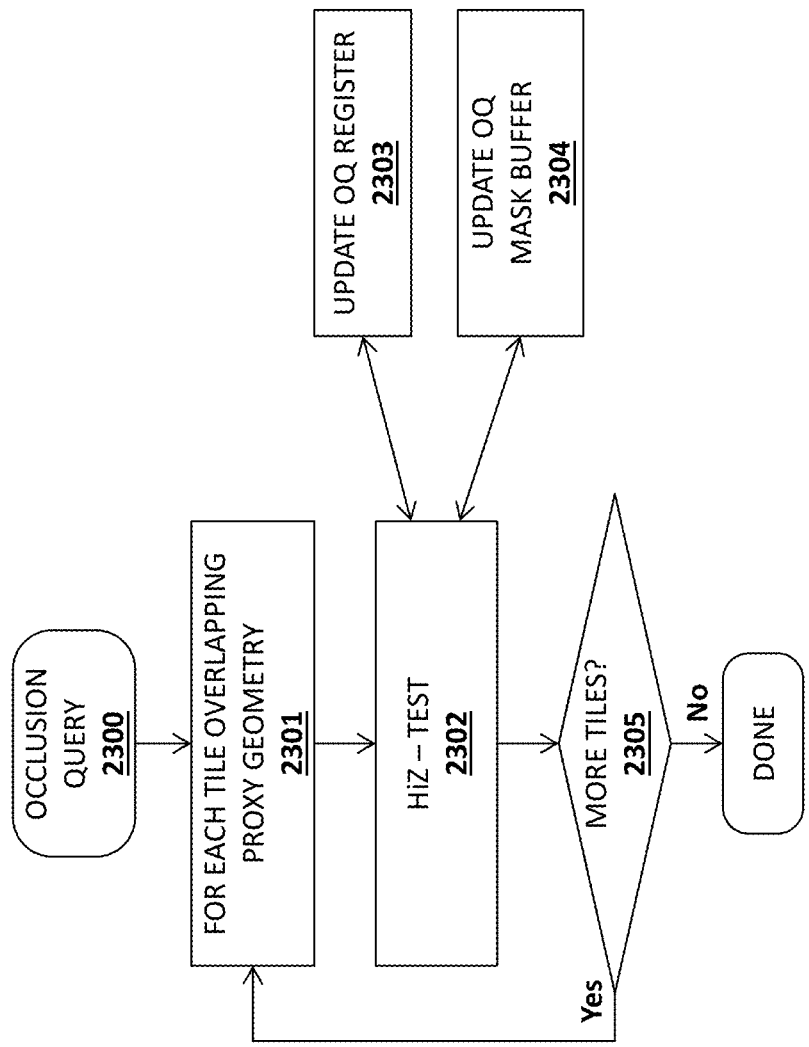
FIG. 23 illustrates a method in accordance with one embodiment of the invention.

In the flow charts in FIGS. 23 and 15, the approximate occlusion query process is extended to generate an occlusion query mask buffer as described above. In FIG. 23, in response to an occlusion query at 2300, each tile overlapping the proxy geometry is selected at 2301 and an HiZ test is performed using the tile at 2302. Results of the HiZ test 2302 are stored in the occlusion query (OQ) mask buffer at 2304. For example, if the tile is fully occluded, then a 1 will be stored for that tile within the OQ mask buffer 2304. In contrast, if the tile is partially occluded or not occluded, then a 0 will be stored within the OQ mask buffer. In addition, at 2303, an OQ register may be updated as well (as in existing systems). If there are additional tiles, determined at 2305, then the process returns to 2301. If not, then the process ends.

Figure 24:
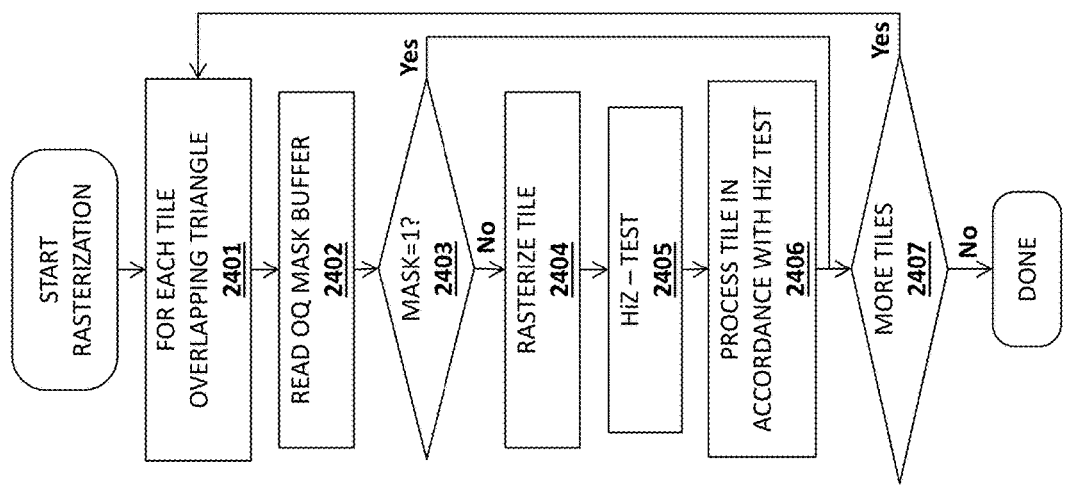
FIG. 24 illustrates a method in accordance with another embodiment of the invention.

FIG. 24 illustrates how the rasterization process may be extended to use data from an occlusion query mask buffer in accordance with one embodiment of the invention. Note that the illustrated embodiment works for both the standard occlusion query and for approximate occlusion queries.

For each tile overlapping a triangle, identified at 2401, the OQ mask buffer is read. As mentioned, the OQ mask buffer may include a bit associated with the current tile which indicates whether or not the tile is fully occluded (e.g., with a mask value of 1). If a mask value of 1 is found, determined at 2403, then the tile is not rasterized and the process jumps to 2406 which determines if there are more tiles remaining. If so, the process returns to 2401. If the mask value associated with the tile is 0, determined at 2403, then this means that the tile is not occluded or partially occluded. As such, the tile is rasterized at 2405 and a HiZ test is performed at 2405 to confirm that the tile is not fully occluded following rasterization. If the rasterized tile is not fully occluded, then it is retained and processed as usual. If the rasterized tile is fully already determined to be occluded, then it may be discarded. If there are more tiles remaining, determined at 2407, then the process returns to 2401.

While the embodiments of the invention described herein identify an occluded tile with a mask value of 1, in other embodiments, occluded tiles may be identified with a mask value of 0. The underlying principles of the invention are not limited to any particular mask value.

Different implementations may be employed in accordance with the underlying principles of the invention. For example, for a 4K ultra high definition resolution of 3840 pixels×2160 and 8×8 tiles, the storage for 1 bit per tile is 16,200 bytes (if the implementation calls for 1 bit per tile for the entire render target). Alternatives to this include using a smaller cache. In most cases, the mask data should be easy to compress. It may also be possible to have more than one draw call and occlusion query in the pipeline at the same time. The storage would then increase further. However, this would be a small cost compared to the gains realized by the embodiments of the invention.

Figure 25:
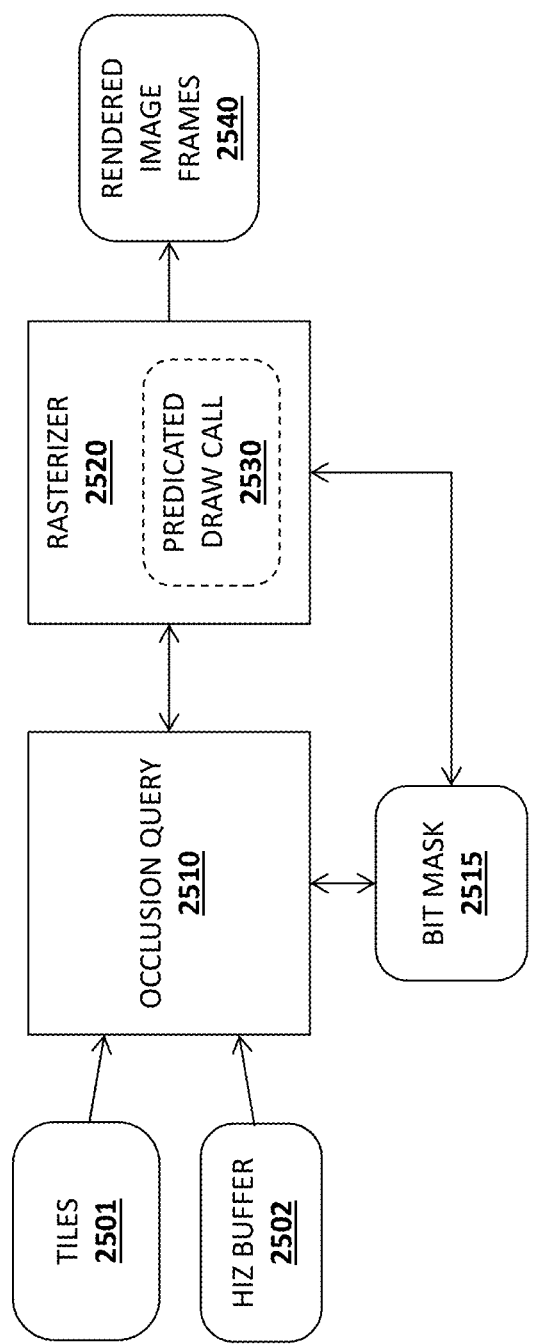
FIG. 25 illustrates a system architecture in accordance with one embodiment of the invention.

A system in accordance with one embodiment of the invention is illustrated in FIG. 25. Occlusion query processing circuitry 2510 compares incoming tiles 2501 to the contents of the HiZ buffer 2502. As mentioned above, each HiZ entry corresponds to a tile of pixels in the depth buffer and the tile test may be implemented when the geometry proxy is rasterized and compared to the HiZ for a particular tile. In one embodiment, occlusion query processing circuit 2510 determines whether or not each tile is fully occluded and stores the results in a bitmask buffer 2515 (e.g., storing a 1 for fully occluded tiles and a 0 for non-occluded or partially occluded tiles). If the entire bounding box cannot be culled, one embodiment of the invention feeds the bitmask 2515 to the rasterizer 2520 which refrains from processing tiles that are known to be occluded from the predicated occlusion query. In one embodiment, predicated draw calls 2530 which generate the final rendered image frames 2540, use the information from the bitmask 2515 to ignore tiles which are fully occluded.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
performing a first pass through a specified portion of a graphics pipeline with only depth rendering active to perform Zmax-mask occlusion culling using data indicating rasterizer sample coverage;
initializing a coarse depth buffer within the specified portion of the graphics pipeline during the first pass, the coarse depth buffer storing depth data at a level of granularity less than that stored in a per-pixel depth buffer, wherein the per-pixel depth buffer includes no per-pixel depth data during the first pass, and wherein updates to the coarse depth buffer are determined based on coverage and depth information received from a rasterizer, and wherein following the first pass a hierarchical representation of the depth data is added to a memory/cache hierarchy; and
performing a second pass through the graphics pipeline following the first pass, the second pass utilizing the full graphics pipeline and further utilizing values in the coarse depth buffer initialized by the first pass.

2. The method as in claim 1 wherein the coarse depth buffer comprises a hierarchical Z (HiZ) buffer.

3. The method as in claim 2 wherein initializing the HiZ buffer comprises performing a masked HiZ depth test followed by a masked HiZ buffer update.

4. The method as in claim 3 wherein the masked HiZ test comprises performing culling of graphics primitives using more than one maximum depth value per tile.

5. The method as in claim 4 further comprising:
reading data from the HiZ buffer to perform culling of graphics primitives on the second pass.

6. The method as in claim 4 further comprising:
using an N bits per pixel or sample mask to indicate which maximum depth value a pixel or sample is connected to.

7. The method of claim 6 including determining whether all incoming samples are occluded by an existing tile.

8. The method of claim 7 including, if not, determining whether an incoming plane covers an entire tile and storing it in a compressed plane representation.

9. The method of claim 8 including, if not, computing a maximum depth mask and maximum depth value from the incoming samples and storing them in an existing tile.

10. An apparatus comprising:
a graphics pipeline;
a specified portion of a graphics pipeline to perform a first pass on graphics data with only depth rendering active to perform Zmax-mask occlusion culling using data indicating rasterizer sample coverage;
a coarse depth buffer to be initialized by the specified portion of the graphics pipeline during the first pass, the coarse depth buffer storing depth data at a level of granularity less than that stored in a per-pixel depth buffer, wherein the per-pixel depth buffer includes no per-pixel depth data during the first pass, and wherein updates to the coarse depth buffer are determined based on coverage and depth information received from a rasterizer, and wherein following the first pass a hierarchical representation of the depth data is added to a memory/cache hierarchy; and
the graphics pipeline to perform a second pass on the graphics data following the first pass utilizing values in the coarse depth buffer initialized by the first pass.

11. The apparatus as in claim 10 wherein the coarse depth buffer comprises a hierarchical Z (HiZ) buffer.

12. The apparatus as in claim 11 wherein the specified portion of the graphics pipeline comprises a masked coarse depth test module to perform a masked HiZ depth test and a masked HiZ updated module to perform a masked HiZ buffer update.

13. The apparatus as in claim 12 wherein the masked HiZ depth test comprises performing culling of graphics primitives using more than one maximum depth value per tile.

14. The apparatus as in claim 13 further comprising:
the masked coarse depth test module to read data from the HiZ buffer to perform culling of graphics primitives on the second pass.

15. The apparatus as in claim 13 further comprising:
the masked coarse depth test module to use an N bits per pixel or sample mask to indicate which maximum depth value a pixel or sample is connected to.

16. The apparatus of claim 15 including determining whether all incoming samples are occluded by an existing tile.

17. The apparatus of claim 16 including, if not, determining whether an incoming plane covers an entire tile and storing it in a compressed plane representation.

18. The apparatus of claim 17 including, if not, computing a maximum depth mask and maximum depth value from the incoming samples and storing them in an existing tile.

19. A non-transitory machine-readable medium having program code stored thereon which, when executed by a machine, causes the machine to perform the operations of:
performing a first pass through a specified portion of a graphics pipeline with only depth rendering active to perform Zmax-mask occlusion culling using data indicating rasterizer sample coverage;
initializing a coarse depth buffer within the specified portion of the graphics pipeline during the first pass, the coarse depth buffer storing depth data at a level of granularity less than that stored in a per-pixel depth buffer, wherein the per-pixel depth buffer includes no per-pixel depth data during the first pass, and wherein updates to the coarse depth buffer are determined based on coverage and depth information received from a rasterizer, and wherein following the first pass a hierarchical representation of the depth data is added to a memory/cache hierarchy; and
performing a second pass through the graphics pipeline following the first pass, the second pass utilizing the full graphics pipeline and further utilizing values in the coarse depth buffer initialized by the first pass.

20. The non-transitory machine-readable medium as in claim 19 wherein the coarse depth buffer comprises a hierarchical Z (HiZ) buffer.

21. The non-transitory machine-readable medium as in claim 20 wherein initializing the HiZ buffer comprises performing a masked HiZ depth test followed by a masked HiZ buffer update.

22. The non-transitory machine-readable medium as in claim 21 wherein the masked HiZ test comprises performing culling of graphics primitives using more than one maximum depth value per tile.

23. The non-transitory machine-readable medium as in claim 22 comprising program code to cause the machine to perform the additional operation of:
reading data from the HiZ buffer to perform culling of graphics primitives on the second pass.

24. The non-transitory machine-readable medium as in claim 22 comprising program code to cause the machine to perform the additional operation of:
using an N bits per pixel or sample mask to indicate which maximum depth value a pixel or sample is connected to.

25. The non-transitory machine-readable medium of claim 24 comprising program code to cause the machine to perform the additional operation of:
determining whether all incoming samples are occluded by an existing tile.

26. The non-transitory machine-readable medium of claim 25 including, if not, determining whether an incoming plane covers an entire tile and storing it in a compressed plane representation.

27. The non-transitory machine-readable medium of claim 26 including, if not, computing a maximum depth mask and maximum depth value from the incoming samples and storing them in an existing tile.

* * * * *